United States Patent
Yoshioka et al.

(10) Patent No.: US 6,472,020 B1
(45) Date of Patent: Oct. 29, 2002

(54) PROCESS FOR MULTILAYER COATING FILM AND AUTOMOTIVE BODIES

(75) Inventors: Manabu Yoshioka, Aichi; Teruzo Toui, Nara, both of (JP)

(73) Assignee: Nippon Paint Co., Ltd., Osaka (JP)

( * ) Notice: Subject to any disclaimer, the term of this patent is extended or adjusted under 35 U.S.C. 154(b) by 66 days.

(21) Appl. No.: 09/870,778

(22) Filed: Jun. 1, 2001

(51) Int. Cl.[7] .............................. B05D 7/16; C08L 51/00
(52) U.S. Cl. .................... 427/407.1; 427/409; 427/410; 525/63
(58) Field of Search .............................. 427/402, 407.1, 427/409, 410; 525/63

(56) References Cited

U.S. PATENT DOCUMENTS

| | | | | |
|---|---|---|---|---|
| 4,749,727 A | * | 6/1988 | Tsuchiya | 204/157.64 |
| 4,810,759 A | * | 3/1989 | Ryntz | 525/440 |
| 5,250,605 A | * | 10/1993 | Hazan et al. | 524/504 |
| 5,360,644 A | * | 11/1994 | Briggs et al. | 427/409 |
| 5,780,530 A | * | 7/1998 | Mizutani et al. | 427/387 |

* cited by examiner

*Primary Examiner*—Shrive P. Beck
*Assistant Examiner*—William Phillip Fletcher, III
(74) *Attorney, Agent, or Firm*—Shanks & Herbert

(57) ABSTRACT

A process for forming a multilayer coating film on automotive bodies which comprises applying a clear coating for top coating, by the wet-on-wet technique, onto a base coating containing a color pigment and/or a luster pigment as applied to a coated automotive panel and then heating the coat layers for curing, said base coating comprising, as resin constituents, a product obtained by grafting a silicate compound (A) onto a hydroxyl-containing acrylic resin or polyester resin and a melamine type curing agent.

4 Claims, No Drawings

PROCESS FOR MULTILAYER COATING FILM AND AUTOMOTIVE BODIES

FIELD OF THE INVENTION

The present invention relates to a process for forming, on automotive bodies, a multilayer coating film having weathering resistance, acid resistance, car wash-free stain resistance and storage stability and excellent in recoat adhesion in non-sand recoating (NSR) and in water resistance and to an automotive body.

PRIOR ART

A clear coating for top coating for automobiles is required to have decorativeness, weathering resistance and like qualities as key performance characteristics in addition to the minimum requirement to be met by any coating, namely storage stability, since said coating constitutes the outermost layer of coating films on automotive bodies. In recent years, from the viewpoint of decorativeness producing a good appearance, it has been further desired that such coatings should maintain their decorativeness, namely their resistance to staining and their giving no unpleasant feeling even after repeated use.

Generally, the outermost layer of automotive coating films is washed with water by the user to remove stains and, where necessary, further treated with wax to remove surface stains. In the case of luxury cars, it is very important from the decorativeness viewpoint to wax for polishing whereas, in the case of cars of practical use, for example passenger cars, it is important from the decorativeness viewpoint that any unpleasant feeling will not be awakened even in repeated use.

Thus, a function such that surface stains will not be left without particularly removing stains by washing with water becomes more important. In other words, if clear coating films which have sufficient hydrophilicity to allow surface contaminants to be washed away by rainwater and the like and thus make the coatings car-wash-free without requiring any work to remove the contaminants are provided, the user will be no more required to waste time and labor for car washing and, thus, a clear coating for automobiles which has such hydrophilicity and is excellent in decorativeness has been desired.

In the pamphlet (1994) on International laid-open Patent Application No. 94/06870, there is disclosed a coating which comprises a hydroxyl-containing organic base resin with an organosilicate and/or a condensation product derived therefrom incorporated therein plus an amino resin curing agent or a (blocked) polyisocyanate compound crosslinking agent as a reaction-curable organic resin. As specific examples preferred as the organosilicate, there are mentioned tetrahydroxysilane, tetramethoxysilane, tetraethoxysilane and the like.

In Japanese Kokai Publication Hei-07-331165, there is disclosed a method of forming top coating films using a curable coating comprising an acid/epoxy-curable coating and a silicon compound having at least one silanol group and/or a hydrolyzable group directly bonded to a silicon atom in each molecule.

In Japanese Kokai Publication Hei-09-220516, there is disclosed a method of forming multilayer coating films for automobiles which comprises applying a water-based coating containing, as a base coat, a water-based tertiary amino- and/or acid group-containing resin, and a compound having an epoxy group and a hydrolyzable silyl group in each molecule.

In Japanese Kokai Publication Hei-10-67844, there is disclosed a heat-curable resin composition which comprises a polyol resin, a blocked polyisocyanate curing agent or an amino resin, a silane coupling agent-treated silicate condensate derived from a partial hydrolyzate-condensate of an alkoxysilane compound by treatment with a silane coupling agent. These technologies are to solve the problems mentioned above about stain resistance by incorporating a relatively low-molecular silicate compound.

In Japanese Kokai Publication Hei-10-140077, there is disclosed a top coating for automobiles which comprises an acid/epoxy-curable coating with a low condensate (low silicate condensate), with a degree of condensation of 2 to 10, of tetramethyl silicate and/or tetraethyl silicate incorporated therein. This technology, too, is to solve the problems mentioned above about stain resistance.

By using a low condensate of tetramethyl silicate and/or tetraethyl silicate as the low silicate condensate, namely by restricting the number of carbon atoms in the alkoxyl group, this technology contrives to retain the reactivity with water. And, as a basic principle, coating films obtained from this coating show high hydrophilicity resulting from the hydroxyl groups formed by the reaction of methoxy or ethoxy groups of the low silicate condensate as occurring in large amounts in the vicinity of the surface of coating films with water upon exposure or treatment with an acid and thus show stain resistance.

However, when a low condensate of tetramethyl silicate, which has highly reactive methoxy groups alone, is used as the low silicate condensate, coating films formed by using the coating at an early stage of storage show high hydrophilicity and good stain resistance whereas, however, during a long period of storage, low silicate condensate molecules may react with one another or the low silicate condensate may react with hydroxyl groups in the epoxy resin in the coating, resulting in viscosity increases and marked worsening in storage stability and/or in insufficient hydrophilicity and insufficient stain resistance of coating films when formed from the coating after storage. Such problems still remain.

When a low condensate of tetraethyl silicate having ethoxy groups alone is used as the low silicate condensate, the reactivity of the ethoxy group is lower than that of the methoxy group, so that the coating shows relatively improved storage stability; however, coating films obtained will not show good hydrophilicity, hence cannot show satisfactory stain resistance.

When a low condensate derived from tetramethyl silicate and one derived from tetraethyl silicate are used as the low silicate condensate, -too, the fact that the silicon atoms in the low silicate condensates have methoxy or ethoxy groups alone as functional groups raises the same storage stability problem; coating films obtained from the coating after storage tend to show unsatisfactory hydrophilicity.

Furthermore, such low silicate condensates provide coating film surfaces with high hydrophilicity, so that the surfaces may possibly take up moisture into the coating films to thereby cause whitening (blushing) and thus worsen the coating film appearance.

When an abnormality in the coating film appearance due to settling of dust, for instance, occurs in an automobile coating line, that portion is locally repaired by polishing with a sandpaper or the like, or the unit block of the automotive panel is recoated again with the corresponding base coating and clear coating for top coating.

It is known, in such cases, that when the recoating anew with the base coating and the clear coating for top coating (for second coat) is carried out without polishing the existing (first coat) clear coating film, the adhesion between the first coat clear coating film and second coat base coating film is generally inferior to that adhesion attainable when the (second coat) base coating and clear coating for top coating are reapplied after polishing the existing (first coat) clear coating film prior to recoating.

Since, when the first coat clear coating film is not polished, the adhesion of the (second coat) base coating film is inferior, as mentioned above, it has become a general practice to apply the second coat base coating and clear coating for top coating after polishing the first coat clear coating film.

If the adhesion of the second coat base coating film shows equally good adhesion even when the second coat base coating and clear coating for top coating are reapplied without polishing the first coat clear coating film, the trouble of polishing the first coat clear coating film will be saved and the cost of repairing or recoating in an automobile coating line will be reduced. Therefore, it has been desired that, on the occasion of applying the second coat base coating and clear coating for top coating without polishing the first coat clear coating film [herein referred to also as "non-sand recoating (NSR)"], the adhesion of the second coat base coating film (herein referred to also as "NSR capacity") be improved.

For providing automotive bodies with stain resistance by repairing or recoating in an automobile coating line, both the base coating and the clear coating for top coating are required to be in accordance with the technologies mentioned above.

In that case, however, since the second coat base coating contains a relatively low-molecular silicate compound in each technology, the adhesion after the lapse of time in a state immersed in water is inferior, so that the water resistance is very poor and bulging or blistering of coating films may possibly occur, although the initial adhesion after NSR is sufficient.

Considering these synthetically, it will be possible to obtain repaired or recoated car bodies further improved in quality if a process for forming a multilayer coating film for automotive bodies is provided by which good NSR capacity, namely good adhesion with the first coat coating film, can be obtained even after the lapse of time, together with good water resistance.

SUMMARY OF THE INVENTION

In view of the above-mentioned state of the art, it is an object of the present invention to provide a process for forming a multilayer coating film on automobiles which have basic performance characteristics such as weathering resistance and acid resistance and are excellent in car wash-free stain resistance as well as in NSR capacity and water resistance, without causing any trouble with respect to storage stability and further provide an automotive body using that process.

The present invention provides a process for forming a multilayer coating film on automotive bodies
which comprises applying a clear coating for top coating, by the wet-on-wet technique, onto a base coating containing a color pigment and/or a luster pigment as applied to a coated automotive panel
and then heating the coat layers for curing,
the base coating comprising, as resin constituents, a product obtained by grafting a silicate compound (A)
onto a hydroxyl-containing acrylic resin or polyester resin and a melamine type curing agent,
the amount of said silicate compound (A) grafted being 0.1 to 50% by weight (on solids basis) relative to the total amount of said resin constituents,
said clear coating for top coating being an acid/epoxy-curable or melamine-curable clear coating,
said clear coating for top coating containing or being free of an alcohol-modified silicate compound (IV) or a silicate graft polymer (V),
at least one of the resin constituents in said acid/epoxy-curable clear coating and said melamine-curable clear coating being obtained by grafting said silicate compound (A) when said clear coating for top coating contains neither the alcohol-modified silicate compound (IV) nor the silicate graft polymer (V),
said silicate graft polymer (V) being obtained by grafting said silicate compound (A) onto a hydroxyl-containing polymer (V-a),
the amount of said alcohol-modified silicate compound (IV) and/or the amount of said silicate compound (A) grafted being 0.1 to 30% by weight (on solids basis) relative to the total amount of said resin constituents,
said silicate compound (A) being represented by the general formula (1):

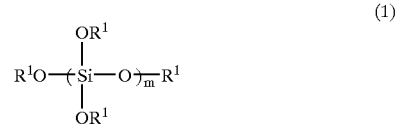
(1)

wherein m represents an integer of 1 to 50 and the $R^1$'s may be different and each represents a substituted or unsubstituted organic group containing 1 to 20 carbon atoms,
and said alcohol-modified silicate compound (IV) being represented by the general formula (2):

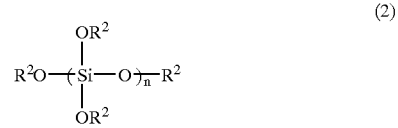
(2)

wherein n represents an integer of 1 to 50 and one or some of the $R^2$'s each represents a substituted or unsubstituted alkyl group containing 2 to 20 carbon atoms or a substituted or unsubstituted aralkyl group containing 7 to 20 carbon atoms and the remaining $R^2$'s respectively represent a methyl group.

The invention further provides an automotive body provided with a multilayer coating film
wherein said multilayer coating film is formed by the process for forming a multilayer coating film on automotive bodies in accordance with the invention.
In the following, the invention is described in detail.

DETAILED DESCRIPTION OF THE INVENTION

The process for forming a multilayer coating film on automotive bodies in accordance with the invention comprises applying a base coating containing a color pigment and/or a luster pigment to a coated automotive panel, then applying a clear coating for top coating by the wet-on-wet technique and curing the coatings by heating.

The above coated automotive panel is not particularly restricted but may be obtained by forming an undercoat film layer (electrodeposition coating film layer, or intermediate coating film layer when necessary) on an automotive panel, applying thereonto a base coating containing a color pigment and/or a luster pigment and applying thereonto a clear coating for top coating by the wet-on-wet technique, followed by curing by heating, or obtained by forming an undercoat film layer on an automotive panel, applying a solid coating containing a color pigment thereonto, followed by curing by heating, or applying a base coating and a clear coating by the wet-on-wet technique, followed by curing by heating, and thereafter applying a clear coating for top coating by the dry-on-wet technique and heating the same for curing, for instance.

The above-mentioned undercoat film layer (electrodeposition coating film layer, or intermediate coating film layer when necessary) on the coated automotive panel can be formed by a method generally used in forming a multilayer coating film on automobile bodies or a like method. The above-mentioned base coating and clear coating for top coating are not particularly restricted, either, but include, among others, those generally used in forming a multilayer coating film on automotive bodies. The methods of applying the above coatings and the method of curing by heating may be, for example, the conventional ones used in forming a multilayer coating film on automotive bodies. The clear coating for top coating used in the practice of the present invention as mentioned later herein may also be used as the clear coating for top coating for the coated automotive panel mentioned above.

The above-mentioned color pigment is not particularly restricted but includes, among others, organic pigments such as azo chelate pigments, insoluble azo pigments, condensed azo pigments, phthalocyanine pigments, indigo pigments, perinone pigments, perylene pigments, dioxane pigments, quinacridone pigments, isoindolinone pigments and metal complex pigments; inorganic pigments such as chrome yellow, yellow iron oxide, iron oxide red, carbon black and titanium dioxide; and extender pigments such as calcium carbonate, barium sulfate, clay and talc. These may be used singly or two or more of them may be used in combination.

The above-mentioned luster pigment is not particularly restricted but includes, among others, aluminum powders, copper powders, nickel powders, stainless steel powders, mica powders, interfering mica powders, colored mica powders, aluminum flakes and graphite flakes. These may be used singly or two or more of them may be used in combination.

The base coating to be used in the practice of the invention comprises, as resin constituents, the product obtained by grafting the silicate compound (A) onto a hydroxyl-containing acrylic resin or polyester resin, and a melamine-based curing agent.

The above hydroxyl-containing acrylic resin can be obtained by copolymerizing a hydroxyl-containing acrylic monomer with another ethylenically unsaturated group-containing monomer by a conventional method.

The above hydroxyl-containing acrylic monomer is not particularly restricted but includes, among others, hydroxyalkyl (meth)acrylates such as 2-hydroxyethyl (meth)acrylate, 2-hydroxypropyl (meth)acrylate and 4-hydroxybutyl (meth)acrylate; Placcel FM-1 (trademark, 2-hydroxyethyl (meth)acrylate-caprolactone adduct, product of Daicel Chemical Industries); polyalkylene glycol mono (meth) acrylates and the like. These may be used singly or two or more of them may be used in combination. In the present specification, "(meth)acrylate" means "acrylate and/or methacrylate".

The above-mentioned other ethylenically unsaturated group-containing monomer is not particularly restricted but includes, among others, alkyl (meth)acrylates such as methyl (meth)acrylate, ethyl (meth)acrylate, propyl (meth)acrylate, n-butyl (meth)acrylate, i-butyl (meth)acrylate, t-butyl (meth)acrylate, 2-ethylhexyl (meth)acrylate and lauryl (meth)acrylate; aromatic vinyl monomers such as styrene and vinyltoluene; epoxy-containing monomers such as glycidyl (meth)acrylate; amino-containing monomers such as dimethylaminoethyl (meth)acrylate and diethylaminoethyl (meth)acrylate; acrylamide monomers such as (meth)acrylamide, N-ethyl(meth)acrylamide, N,N-butoxymethyl (meth)acrylamide and N-methylacrylamide; acrylonitrile, vinyl acetate, acrylic acid, methacrylic acid, etc. These may be used singly or two or more of them may be used in combination.

The above-mentioned polyester resin can be obtained by subjecting an acid component mainly composed of a polybasic carboxylic acid and an alcohol component mainly composed of a polyhydric alcohol to polycondensation by an ordinary method.

The above acid component is not particularly restricted but includes, among others, terephthalic acid, isophthalic acid, phthalic acid, and anhydrides of these; 2,6-naphthalenedicarboxylic acid, 2,7-naphthalenedicarboxylic acid, like aromatic dicarboxylic acids, and anhydrides of these; aliphatic dicarboxylic acids such as succinic acid, adipic acid, azelaic acid, sebacic acid, dodecanedicarboxylic acid and 1,4-cyclohexanedicarboxylic acid, and anhydrides of these; lactones such as γ-butyrolactone and ε-caprolactone; aromatic monohydroxycarboxylic acids such as p-hydroxyethoxybenzoic acid; at least tribasic polybasic carboxylic acids such as trimellitic acid, trimesic acid and pyromellitic acid; hydroxycarboxylic acids corresponding to these, and the like. These may be used singly or two or more of them may be used in combination.

The above-mentioned alcohol component is not particularly restricted but includes, among others, ethylene glycol, 1,3-propanediol, 1,4-butanediol, 1,5-pentanediol, 1,5-hexanediol, diethylene glycol, triethylene glycol, 1,4-cyclohexanediol, 1,4-cyclohexanedimethanol, bisphenol A-alkylene oxide adducts and bisphenol S-alkylene oxide adducts; aliphatic glycols having a side chain(s) such as 1,2-propanediol, neopentyl glycol, 1,2-butanediol, 1,3-butanediol, 1,2-pentanediol, 2,3-pentanediol, 1,4-pentanediol, 1,4-hexanediol, 2,5-hexanediol, 3-methyl-1,5-pentanediol, 1,2-dodecanediol and 1,2-octadecanediol; and at least trihydric polyhydric alcohols such as trimethylolpropane, glycerol and pentaerythritol. These may be used singly or two or more of them may be used in combination.

The above-mentioned hydroxyl-containing acrylic resin or polyester resin has an acid value of not more than 100 mg KOH/g, a hydroxyl value of 5 to 200 mg KOH/g, a number average molecular weight (Mn) of 500 to 30,000 and a glass transition temperature (Tg) of −20° C. to 60° C.

When the acid value exceeds 100 mg KOH/g, the viscosity of the hydroxyl-containing acrylic resin or polyester resin becomes excessively high, making it difficult to handle the resin and obtain a high-solid heat-curable resin coating. When the hydroxyl value is less than 5 mg KOH/g, the curability of the coating becomes insufficient and the efficiency and amount of grafting of the silicate compound (A)

are restricted. When it exceeds 200 mg KOH/g, the water resistance of the coating films lowers. When the number average molecular weight (Mn) is below 500, the strength or water resistance of the coating films decreases. When it is above 30,000, the viscosity of the hydroxyl-containing acrylic resin or polyester resin becomes excessively high, making it difficult to handle the resin, hence a high-solid heat-curable resin coating becomes difficult to obtain. When the glass transition temperature is below −20° C., the coating films become soft and weak and, when it is above 60° C., the coating films tend to become uneven and to become excessively hard and tend to undergo cracking.

Preferably, the acid value is 2 to 50 mg KOH/g, the hydroxyl value is 30 to 200 mg KOH/g, the number average molecular weight (Mn) is 500 to 25,000, and the glass transition temperature (Tg) is 0° C. to 40° C. In the present specification, the acid value and hydroxyl value are given on the solids basis and the number average molecular weight (Mn) is given in terms of the number average molecular weight on the polystyrene equivalent basis as determined by GPC (gel permeation chromatography).

The melamine type curing agent mentioned above comprises an amino resin and/or a blocked polyisocyanate compound.

The amino resin is not particularly restricted but includes, among others, melamine resins, benzoguanamine resins, glycoluril resins and urea resins. These may be used singly or two or more of them may be used in combination. Among them, melamine resins and benzoguanamine resins are generally used.

The melamine resins mentioned above may be converted to alkyl-etherified melamine resins by alkyl etherification and, among them, methoxy- and/or butoxy-substituted melamine resins are preferred.

As the above methoxy- and/or butoxy-substituted melamine resins, there maybe mentioned those having methoxy groups alone, such as Cymel 325, Cymel 327 and Cymel 370, those of methoxy-butoxy mixed type, such as Cymel 202, Cymel 204, Cymel 232, Cymel 235, Cymel 236, Cymel 238, Cymel 254, Cymel 266 and Cymel 267 (all trademarks, products of Mitsui Cytec) and those having butoxy groups alone, such as Mycoat 506 (trademark, product of Mitsui Cytec), U-Van 20N60 and U-Van 20SE (both trademarks, products of Mitsui Chemical), among others. These may be used singly or two or more of them may be used in combination. As for the above-mentioned benzoguanamine resins as well, derivatives thereof obtained by similar substitution may also be used.

The blocked polyisocyanate mentioned above is obtained from a polyisocyanate compound by blocking with a blocking agent.

The above polyisocyanate compound is not particularly restricted but may be any compound having at least two isocyanato groups in each molecule. Thus, there may be mentioned, among others, aliphatic diisocyanates such as hexamethylene diisocyanate (HMDI) and trimethylhexamethylene diisocyanate (TMDI); alicyclic diisocyanates such as isophoronediisocyanate (IPDI); aralicyclic diisocyanates such as xylylene diisocyanate (XDI); aromatic diisocyanates such as tolylene diisocyanate (TDI) and 4,4'-diphenylmethanediisocyanate (MDI); hydrogenated diisocyanates such as dimer acid diisocyanate (DDI), hydrogenated TDI (HTDI), hydrogenated XDI (H6XDI) and hydrogenated MDI (H12MDI); dimers, trimers and higher-molecular polyisocyanates derived from those diisocyanates; and adducts with polyhydric alcohols such as trimethylolpropane, or with water or low-molecular polyester resins. These may be used singly or two or more of them may be used in combination.

The above-mentioned blocking agent is not particularly restricted but includes, among others, oximes such as methyl ethyl ketoxime, acetoxime, cyclohexanone oxime, acetophenone oxime and benzophenone oxime; phenols such as m-cresol and xylenol; alcohols such as methanol, ethanol, butanol, 2-ethylhexanol, cyclohexanol and ethylene glycol monoethyl ether; lactams such as ε-caprolactam, diethyl malonate, diketones such as acetoacetate esters; mercaptans such as thiophenol; ureas such as thiourea; imidazoles; carbamic acids, and the like. These may be used singly or two or more of them may be used in combination.

The method of blocking the above polyisocyanate compound with the above blocking agent is not particularly restricted but may comprise, for instance, reacting them in the conventional manner until there is no more free isocyanate group remaining.

Commercial products may be used as the above-mentioned blocked polyisocyanate compound, for example Desmodur series (trademark, products of Sumitomo Bayer Urethane), Pernoc D series (trademark, products of Dainippon Ink & Chemicals), Takenate B series (trademark, products of Takeda Chemical Industries), Coronate 2500 series (trademark, products of Nippon Polyurethane Industry) and so on. Among these, those blocked with oximes, lactams or diketones are preferred.

The base coating to be used in the practice of the invention is preferably formulated so that the isocyanate is contained therein in an amount of not less than one equivalent relative to the hydroxyl value equivalent of the above-mentioned hydroxyl-containing acrylic resin or polyester resin. Specifically, the above melamine type curing agent is preferably incorporated in an amount such that the weight ratio between the above hydroxyl-containing acrylic resin or polyester resin and the melamine type curing agent amounts to 8/2 to 5/5, preferably 7/3 to 6/4. In the case of a polyisocyanate compound, the addition amount thereof may be within the range of 0.8 to 1.5 times the above hydroxyl value equivalent. When it is less than 0.8 equivalent relative to the above hydroxyl value equivalent, the coating will show insufficient curability, hence only soft and weak coating films will be obtained; not only the hardness but also the chemical resistance and stain resistance of the coating films will lower. When it is more than 1.5 times, the effect obtainable will no longer be proportional to the amount of incorporation of the polyisocyanate compound and, in addition, the coating films show decreases in strength, hardness, workability and chemical resistance, among others, and also tend to yellow and show decreased weathering resistance. A preferred range is 1.0 to 1.2 times.

The above base coating comprises, as resin constituents, the product obtained by grafting the silicate compound (A) onto the above hydroxyl-containing acrylic resin or polyester resin, and the above melamine type curing agent. It is enough that the above silicate compound (A) is grafted onto part of the above hydroxyl-containing acrylic resin or polyester resin. It is not always necessary that all of the resin is grafted with the silicate compound (A).

The amount of grafting of the above silicate compound (A) in the above base coating, when expressed in terms of the amount of the above silicate compound (A) relative to the total amount of the above-mentioned resin constituents, is 0.1 to 50% by weight. When the amount of the above silicate compound (A) is less than 0.1% by weight, the hydrophilicity of the coating films will not be manifested to a satisfactory extent, hence the stain resistance will be poor. When it is in excess of 50% by weight, the coating films may possibly be lacking in the water resistance required to maintain their good appearance. Preferred is 3 to 25% by weight, more preferably 5 to 20% by weight. The % by weight values given above are on the solids basis.

The clear coating for top coating to be used in the practice of the invention is an acid/epoxy-curable clear coating or a melamine-curable clear coating. The acid/epoxy-curable clear coating preferably comprises a half-esterified acid group-containing acrylic copolymer (I) and an epoxy-containing acrylic copolymer (II) as resin constituents.

The above half-esterified acid group-containing acrylic copolymer (I) is obtainable by obtaining a copolymer from an acid anhydride group-containing, radical-polymerizable monomer (I-a) and another radical-polymerizable monomer (I-b) and then half-esterifying the acid anhydride group with a low-molecular alcohol compound.

The above acid anhydride group-containing, radical-polymerizable monomer (I-a) is not particularly restricted but may be any of those acid anhydride group-containing, radical-polymerizable monomers for obtaining the above half-esterified acid group-containing acrylic copolymers (I). It includes, among others, itaconic anhydride, maleic anhydride and citraconic anhydride. These may be used singly or two or more of them may be used in combination.

The above-mentioned other radical-polymerizable monomer (I-b) is not particularly restricted but includes the same ones as mentioned hereinabove referring to the hydroxyl-containing acrylic monomer or other ethylenically unsaturated bond-containing monomer.

In the comonomer composition in producing the copolymer from the above acid anhydride group-containing, radical-polymerizable monomer (I-a) and other radical-polymerizable monomer (I-b), the above acid anhydride group-containing, radical-polymerizable monomer (I-a) preferably amounts to 10 to 40% by weight, in particular 15 or 30% by weight, based on the total monomer weight.

The method of effecting the above copolymerization is not particularly restricted but the copolymerization can be carried out in a conventional manner of radical polymerization or in a like manner of solution polymerization, for instance. The above copolymer preferably has a number average molecular weight (Mn) of 500 to 10,000, in particular 1,000 to 8,000. When the number average molecular weight (Mn) is less than 500, the curability of the coating will be insufficient. When it exceeds 10,000, the copolymer will show an increased viscosity and it will be difficult to formulate a high-solid heat-curable coating.

Each molecule of the above copolymer contains at least two acid anhydride groups. When the number thereof is less than 2, the copolymer has a drawback in that the curability is insufficient. Preferably, the number is 2 to 15.

The half esterification is carried out after obtaining the above copolymer. The half-esterifying agent to be used for the above half esterification of the acid anhydride groups is not particularly restricted but may be any low-molecular alcohol compound. However, it preferably has its molecular weight of not greater than 200. It includes, among others, methanol, ethanol, n-propanol, i-propanol, n-butanol, i-butanol, t-butanol, methylcellosolve, ethylcellosolve, dimethylaminoethanol, diethylaminoethanol, acetol, allyl alcohol and propargyl alcohol. These may be used singly or two or more of them may be used in combination. Particularly preferred compounds among these are acetol, allyl alcohol, propargyl alcohol and methanol.

The reaction method for the above half esterification is not particularly restricted but, for example, the reaction can be carried out in the conventional manner at a temperature from room temperature to 120° C. in the presence of a catalyst. The catalyst is not particularly restricted but includes, among others, tertiary amines such as triethylamine and tributylamine; and quaternary ammonium salts such as benzyltrimethylammonium chloride, benzyltrimethylammonium bromide, benzyltributylammonium chloride and benzyltributylammonium bromide. These may be used singly or two or more of them may be used in combination.

The above epoxy-containing acrylic copolymer (II) is obtained by copolymerizing 30 to 70 parts by weight of an epoxy-containing, radical-polymerizable monomer (II-a), 10 to 50 parts by weight of a hydroxyl-containing, radical-polymerizable monomer (II-b) and 20 to 60 parts by weight of another radical-polymerizable monomer (II-c).

The above epoxy-containing, radical-polymerizable monomer (II-a) is not particularly restricted but includes, among others, glycidyl (meth)acrylate, 3,4-epoxycyclohexanylmethyl methacrylate and the like. These may be used singly or two or more of them may be used in combination.

The above hydroxyl-containing, radical-polymerizable monomer (II-b) is not particularly restricted but includes, among others, the same ones as mentioned hereinabove referring to the hydroxyl-containing acrylic monomer. The above other radical-polymerizable monomer (II-c) is not particularly restricted but includes, among others, the same ones as mentioned hereinabove referring to the other ethylenically unsaturated bond-containing monomer.

The above epoxy-containing acrylic copolymer (II) can be obtained by copolymerizing the above radical-polymerizable monomers using a radical polymerization initiator. The method of copolymerization is not particularly restricted but the copolymerization can be carried out in the manner of ordinary radical polymerization or like solution polymerization, for instance. For example, it can be carried out at a polymerization temperature of 100 to 140° C. for a polymerization period of 3 to 8 hours.

The above radical polymerization initiator is not particularly restricted but includes, among others, t-butyl peroxy-2-ethylhexanoate, dimethyl 2,2'-azobisisobutyrate and the like. These may be used singly or two or more of them may be used in combination. The above radical polymerization initiator is preferably used in an amount of 3 to 15% by weight relative to the total amount of the monomers mentioned above. In the above copolymerization, a chain transfer agent and like additives may further be added.

The above epoxy-containing acrylic copolymer (II) has a number average molecular weight (Mn) of 1,000 to 8,000 and has 2 to 10 epoxy groups and 2 to 12 hydroxyl groups in each molecule, the epoxy equivalent thereof is 100 to 800 and the hydroxyl value thereof is 5 to 200 mg KOH/g. When the epoxy equivalent is less than 100, the cured coating films will become excessively hard and the weathering resistance will become poor. When it exceeds 800, the curability of the coating becomes insufficient. When the hydroxyl value is less than 5 mg KOH/g, the adhesion will be poor. When it exceeds 200 mg KOH/g, the water resistance of the cured coating films becomes insufficient. Preferably, the copolymer has 3 to 8 epoxy groups and 4 to 10 hydroxyl groups in each molecule and has an epoxy equivalent of 200 to 600 and a hydroxyl value of 10 to 150 mg KOH/g. In the present specification, the epoxy equivalent is given on the solids basis.

Preferably, the acid/epoxy-curable clear coating to be used in the practice of the invention further comprises a carboxyl-containing polyester resin (III) as a resin constituent. The carboxyl-containing polyester resin (III) is obtainable by half-esterifying, with an acid anhydride group-containing compound, a polyester polyol obtained by allowing a lactone compound to add to a low-molecular polyhydric alcohol in the manner of chain extension.

The above carboxyl-containing polyester resin (III) shows a sharp molecular weight distribution and, therefore, the clear coating for top coating to be used in the practice of the invention can be made one having a high solids content by using the above carboxyl-containing polyester resin (III) as a resin constituent. Thus, coating films excellent in weathering resistance and water resistance can be obtained and, at the same time, the coatings show good chipping resistance and good surface appearance.

The above low-molecular polyhydric alcohol is not particularly restricted but preferably has its molecular weight of not greater than 400. As preferred examples, those having at least 3 hydroxyl groups per molecule, such as trimethylolpropane, trimethylolethane, 1,2,4-butanetriol, ditrimethylolpropane, pentaerythritol, dipentaerythritol and glycerol. These may be used singly or two or more of them may be used in combination.

The above lactone compound may be any cyclic compound capable of reacting with a reaction reagent and thus undergoing ring opening owing to its having an intraannular oxygen atom to give a terminal hydroxyl group. The above lactone compound preferably contains 4 to 7 carbon atoms because of ready susceptibility to the ring opening addition reaction.

The above lactone compound is not particularly restricted but includes, among others, ε-caprolactone, γ-caprolactone, γ-valerolactone, ε-valerolactone, γ-butyrolactone and the like. These may be used singly or two or more of them may be used in combination. Among them, ε-caprolactone, γ-valerolactone and γ-butyrolactone are preferred.

The above chain extension reaction can be carried out under the same conditions as in ordinary ring opening addition reactions. For example, the above polyester polyol resulting from chain extension of the above low-molecular alcohol can be obtained by carrying out the reaction without using any solvent or in an appropriate solvent at a temperature of 80 to 200° C. for a period not longer than 5 hours. On that occasion, a tin catalyst or the like may be used.

In carrying out the above chain extension reaction, the lactone compound is used in an amount of 0.2 to 10 moles per mole of the low-molecular polyhydric alcohol. When the amount of the lactone compound is less than 0.2 mole per mole of the hydroxyl group of the low-molecular polyhydric alcohol, the coating films become hard and the impact resistance thereof decreases. When that amount is more than 10 moles, the hardness of the coating films decreases. That amount is preferably 0.25 to 5 moles, more preferably 0.3 to 3 moles.

The above carboxyl-containing polyester resin (III) has an acid value of 50 to 350 mg KOH/g, a number average molecular weight (Mn) of 400 to 3,500 and a weight average molecular weight (Mw)/number average molecular weight (Mn) ratio of not more than 1.8. When the acid value is less than 50, the coating will be insufficient in curability and, when the acid value is above 350, the carboxyl-containing polyester resin (III) has an excessively high viscosity and high-solid heat-curable coatings can hardly be formulated. When the molecular weight is less than 400, the curability of the coating will be insufficient or the water resistance of the coatings will lower. When the molecular weight is above 3,500, the viscosity of the carboxyl-containing polyester resin (III) becomes excessively high, rendering it difficult to handle the same and formulate high-solid heat-curable coatings. When the weight average molecular weight (Mw)/number average molecular weight (Mn) ratio exceeds 1.8, the water resistance and weathering resistance of the coatings will decrease.

Preferably, the acid value is 100 to 300 mg KOH/g, the number average molecular weight (Mn) is 500 to 2,500 and the weight average molecular weight (Mw)/number average molecular weight (Mn) ratio is not more than 1.5. More preferably, the acid value is 150 to 250 mg KOH/g, the number average molecular weight (Mn) is 700 to 2,000 and the weight average molecular weight (Mw)/number average molecular weight (Mn) ratio is not more than 1.35.

The method of reacting the above polyester polyol with the above acid anhydride group-containing compound for half esterification is not particularly restricted but the reaction can be carried out, for example, in the conventional manner by contacting the above polyester polyol with the above acid anhydride group-containing compound at a temperature from room temperature to 150° C. at ordinary pressure.

The above acid anhydride group-containing compound is not particularly restricted but includes, among others, phthalic anhydride, tetrahydrophthalic anhydride, hexahydrophthalic anhydride, 4-methylhexahydrophthalic anhydride, trimellitic anhydride, succinic anhydride and the like. These may be used singly or two or more of them may be used in combination.

Generally, the above acid anhydride compound is used preferably in an amount of 0.2 to 1.0 mole, in particular 0.5 to 0.9 mole, as expressed in terms of number of moles of acid anhydride group, per mole of the hydroxyl group of the above polyester polyol. When the amount of the acid anhydride groups in the acid anhydride compound is less than 0.2 mole per mole of the hydroxyl group of the polyester polyol, the curability of the coating will be insufficient.

It is not always necessary, however, that all hydroxyl groups of the above polyester polyol have been modified into carboxyl groups; some hydroxyl groups may remain. That is to say, the above carboxyl-containing polyester resin (III), when it contains a hydroxyl group(s), provides the coating film surface with a carboxyl group(s) and a hydroxyl group(s) simultaneously, so that, in the case of recoating, for instance, it can provide better adhesiveness as compared with the carboxyl-containing polyester resin (III) having no hydroxyl group.

When the carboxyl-containing polyester resin (III) having a hydroxyl group(s) is used, the carboxyl-containing polyester resin (III) has a hydroxyl value of not more than 150 mg KOH/g. When the hydroxyl value exceeds 150 mg KOH/g, the water resistance of the coating films will decrease. A value of 5 to 100 mg KOH/g is preferred and a value of 10 to 80 mg KOH/g is more preferred.

When the above carboxyl-containing polyester resin (III) has hydroxyl and carboxyl groups, it can react with and bind to the epoxy-containing acrylic copolymer (II), the alcohol-modified silicate compound (IV) or a polymer obtained by grafting the silicate compound (A), as mentioned later herein, and, therefore, can give stronger and firmer coating films. In this case, it preferably has not less than 0.1 hydroxyl group per molecule.

The above carboxyl-containing polyester resin (III) is preferably contained in an amount of 5 to 70% by weight relative to the total amount of resin constituents. When it is less than 5% by weight, high-solid heat-curable coating films can hardly be formulated. When it exceeds 70% by weight, the weathering resistance of the coatings decreases. Its content is preferably 5 to 50% by weight, more preferably 10 to 40% by weight. The % by weight values given above are on the solids basis.

Referring to the resin constituents in the acid/epoxy-curable clear coating to be used according to the invention, the ratio [total number of epoxy groups in the epoxy-containing acrylic copolymer (II)]/[total number of half-esterified acid anhydride groups and carboxyl groups in the half-esterified acid group-containing acrylic copolymer (I) and carboxyl-containing polyester resin (III)] is preferably 0.5 to 1.5, in particular 0.6 to 1.3, and the ratio [total number of hydroxyl groups in the epoxy-containing acrylic copolymer (II) ]/[total number of half-esterified acid anhydride groups in the half-esterified acid group-containing acrylic copolymer (I)] is preferably 0.1 to 1.5, more preferably 0.3 to 1.2.

Specifically, such ratios are obtained by using the epoxy-containing acrylic copolymer (II), for example, in an amount of 50 to 250 parts by weight, preferably 80 to 150 parts by weight, per 100 parts by weight of the total amount of the half-esterified acid group-containing acrylic copolymer (I) and carboxyl-containing polyester resin (III). When the amount of the epoxy-containing acrylic copolymer (II) is less than 50 parts by weight, sufficient coating film curing will not be attained, with the result that the water resistance, weathering resistance, etc. of the cured coating films decrease. When it exceeds 250 parts by weight, unreacted carboxyl groups remain, leading to decreased chemical resistance.

The melamine-curable clear coating to be used in the practice of the invention preferably comprises, as the resin constituents, 30 to 85% by weight of a hydroxyl-containing acrylic resin and 15 to 70% by weight of a melamine type curing agent.

As the above hydroxyl-containing acrylic resin and melamine type curing agent, there may be mentioned the same ones as mentioned hereinabove, respectively. The above hydroxyl-containing acrylic resin preferably has a number average molecular weight (Mn) of 800 to 8,000 and a hydroxyl value of 30 to 20.0 mg KOH/g.

In a first mode of embodiment thereof, the clear coating for top coating to be used in the practice of the invention does not contain any alcohol-modified silicate compound (IV) or silicate-grafted polymer (V). In this case, at least one of the resin components in the above acid/epoxy-curable clear coating and the above melamine-curable clear coating is obtained by grafting the above silicate compound (A).

Thus, when neither the alcohol-modified silicate compound (IV) nor the above silicate graft polymer (V) is contained, the clear coating for top coating to be used in the practice of the invention is provided with stain resistance by using at least one of the resin constituents in the above acid/epoxy-curable clear coating and the above melamine-curable clear coating in a form having the silicate compound (A) as a graft.

When, in the above-mentioned first mode of embodiment, the above acid/epoxy-curable clear coating is used, there are such cases as case (1) where the above half-esterified acid group-containing acrylic copolymer (I) is obtained by grafting the silicate compound (A) while the above epoxy-containing acrylic copolymer (II) is not obtained by grafting the silicate compound (A), case (2) where the above half-esterified acid group-containing acrylic copolymer (I) is not obtained by grafting the silicate compound (A) while the above epoxy-containing acrylic copolymer (II) is obtained by grafting the silicate compound (A), and case (3) where the above half-esterified acid group-containing acrylic copolymer (I) and the above epoxy-containing acrylic copolymer (II) are obtained by grafting the silicate compound (A).

When the above melamine-curable clear coating is used, there may be mentioned, for instance, the case where the above hydroxyl-containing acrylic resin is obtained by grafting the silicate compound (A).

When the acid/epoxy-curable clear coating is used, it is enough for the half-esterified acid group-containing acrylic copolymer (I) and/or epoxy-containing acrylic copolymer (II) obtained by partly grafting silicate compounds (A). It is not necessary that all copolymer molecules have the silicate compound (A) grafted thereon. When the melamine-curable clear coating is used, it is enough for the hydroxyl-containing acrylic resin obtained by partly grafting silicate compounds (A); it is not necessary that all resin molecules have the silicate compound (A) grafted thereon.

Those cases are preferred since it is no more necessary for the composition to contain the above alcohol-modified silicate compound (IV) or silicate graft polymer (V) and this simplifies the production process. And, when the above acid/epoxy-curable clear coating is used and the silicate compound (A) is grafted onto the half-esterified acid group-containing acrylic copolymer (I), the half-esterified acid group-containing acrylic copolymer (I) is preferably caused to contain hydroxyl groups in the production step thereof by copolymerizing such a hydroxyl-containing monomer as mentioned above.

When, in the above-mentioned first mode of embodiment, the above acid/epoxy-curable clear coating is used, the above epoxy-containing acrylic copolymer (II) is preferably obtained by grafting the silicate compound (A) since the crosslink density is improved by the crosslinking reaction between the half-esterified acid group-containing acrylic copolymer (I) and the silicate compound (A) grafted.

In a second mode of embodiment thereof, the clear coating for top coating to be used in the practice of the invention contains the alcohol-modified silicate compound (IV) or silicate-grafted polymer (V). In this case, the silicate graft polymer (V) is obtained by grafting the silicate compound (A) onto a hydroxyl-containing polymer (V-a).

And, when, in this case, the above acid/epoxy-curable clear coating is used, the above half-esterified acid group-containing acrylic copolymer (I) or epoxy-containing acrylic copolymer (II) may or may not have the silicate compound (A) grafted thereon.

Thus, when, in the above-mentioned second mode of embodiment which includes the alcohol-modified silicate compound (IV) or silicate graft polymer (V), the above acid/epoxy-curable clear coating is used, there may arise such cases as case (1) where the half-esterified acid group-containing acrylic copolymer (I) is obtained by grafting the silicate compound (A) while the epoxy-containing acrylic copolymer (II) is not obtained by grafting the silicate compound (A), case (2) where the half-esterified acid group-containing acrylic copolymer (I) is not obtained by grafting the silicate compound (A) while the epoxy-containing acrylic copolymer (II) is obtained by grafting the silicate compound (A), case (3) where the half-esterified acid group-containing acrylic copolymer (I) and the above epoxy-containing acrylic copolymer (II) are obtained by grafting the silicate compound (A), and case (4) where neither the half-esterified acid group-containing acrylic copolymer (I) nor the epoxy-containing acrylic copolymer (II) is obtained by grafting the silicate compound (A).

When the above melamine-curable clear coating is used, there can be mentioned the case (1) where the above hydroxyl-containing acrylic resin is obtained by grafting the silicate compound (A) and case (2) it is not obtained by grafting the silicate compound (A).

When the acid/epoxy-curable clear coating is used and the half-esterified acid group-containing acrylic copolymer (I) and/or epoxy-containing acrylic copolymer (II) is obtained by grafting the silicate compound (A), it is enough for the half-esterified acid group-containing acrylic copolymer (I) and/or epoxy-containing acrylic copolymer (II) obtained by partly grafting silicate compounds (A). It is not necessary that all copolymer molecules are obtained by grafting the silicate compound (A). When the melamine-curable clear coating is used and the hydroxyl-containing acrylic resin is obtained by grafting the silicate compound (A), it is enough for the hydroxyl-containing acrylic resin to have partly silicate compounds (A) grafted; it is not necessary that all resin molecules is obtained by grafting the silicate compound (A).

In cases where the above acid/epoxy-curable clear coating further comprises the above carboxyl-containing polyester resin (III) as a resin constituent, too, the carboxyl-containing polyester resin (III) can be converted to is obtained by grafting the silicate compound (A) in the same manner as mentioned above.

In either of the above-mentioned first and second modes of embodiment of the constitution of the clear coating for top coating to be used in the practice of the invention, at least one of the resin constituents is a polymer obtained by grafting silicate compounds (A) and/or the coating comprises the alcohol-modified silicate compound (IV) or silicate graft polymer (V).

The silicate graft polymer (V) to be used in the practice of the invention is obtained by grafting the silicate compound (A) onto a hydroxyl-containing polymer (V-a).

The hydroxyl-containing polymer (V-a) is not particularly restricted but may be any hydroxyl-containing polymer. Thus, it includes, among others, hydroxyl-containing acrylic resins, hydroxyl-containing polyester resins and hydroxyl-containing alkyd resins. These may be used singly or two or more of them may be used in combination.

The hydroxyl-containing acrylic resins are not particularly restricted but include, among others, the same ones as mentioned hereinabove.

The hydroxyl-containing polyester resins and hydroxyl-containing alkyd resins are not particularly restricted but include, among others, the polyester resins mentioned above as well as those obtained by optionally using a semidrying oil, nondrying oil or the like in the polycondensation step.

The semidrying oil is not particularly restricted but includes, among others, soybean oil, safflower oil, tall oil, etc. The nondrying oil is not particularly restricted but includes, among others, coconut oil, rapeseed oil, etc. These may be used singly or two or more of them may be used in combination. The above hydroxyl-containing polyester resins and hydroxyl-containing alkyd resins have an oil length of not more than 40%, preferably not more than 30%.

The above hydroxyl-containing polymer (V-a) may have, in addition to its hydroxyl groups, a carboxyl, epoxy or like group or groups. The hydroxyl-containing polymer (V-a) preferably has a hydroxyl value of 20 to 200 mg KOH/g and a number average molecular weight (Mn) of 500 to 10,000.

When the hydroxyl value is less than 20 mg KOH/g, the grafting efficiency and the amount of grafting are limited and, when it exceeds 200 mg KOH/g, the water resistance of the coating film decreases. When the number average molecular weight (Mn) is less than 500, the strength of the coating film decreases and, when it exceeds 10,000, the viscosity of the coating is increased and the appearance becomes poor. A hydroxyl value of 40 to 150 and a number average molecular weight of 800 to 8,000 are preferred.

The amount of the alcohol-modified silicate compound (IV) and/or the amount of the silicate compound (A) grafted in the above clear coating for top coating is such that the total amount of the alcohol-modified silicate compound (IV) and/or the silicate compound (A) grafted is 0.1 to 30% by weight relative to the total amount of the resin constituents mentioned above. When the amount of the alcohol-modified silicate compound (IV) and/or the silicate compound (A) grafted is less than 0.1% by weight, the coating films can no longer manifest sufficient hydrophilicity, hence have poor stain resistance. When it exceeds 30% by weight, the coating films may no loner have that water resistance sufficient to maintain their good appearance. The amount in question is preferably 3 to 25% by weight, more preferably 5 to 20% by weight. The above % by weight values are on the solids basis, and the total amount of the resin constituents, when the silicate graft polymer (V) is included therein, includes the amount of the hydroxyl-containing polymer (V-a).

The silicate compound (A) to be used in accordance with the present invention is represented by the general formula (1):

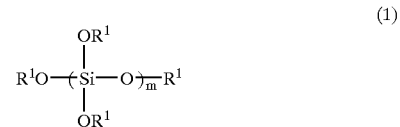

In the above general formula (1), m represents an integer of 1 to 50 and the $R^1$'s may be different and each represents a substituted or unsubstituted organic group containing 1 to 20 carbon atoms.

When m in the above general formula (1) exceeds 50, the viscosity of the polymer obtained by grafting silicate compounds (A) becomes high and it becomes difficult for the polymer to spread on the coating film surface. For the polymer obtained by grafting silicate compounds (A) to have an appropriate viscosity, m is preferably 5 to 30, more preferably 7 to 20, still more preferably 10 to 15.

The substituted or unsubstituted organic group containing 1 to 20 carbon atoms makes it easy for the polymer obtained by grafting silicate compounds (A) to develop onto the coating film surface in the wet coating film and thus occur abundantly in the vicinity of the coating film surface in the step of coating. Thus, for appropriately reducing the compatibility with the other resin constituents, the group preferably contains 1 to 10 carbon atoms.

The above substituted or unsubstituted organic group containing 1 to 20 carbon atoms is not particularly restricted but includes, among others, substituted or unsubstituted alkyl, cycloalkyl, aryl, aralkyl, acryl and like groups containing 1 to 20 carbon atoms. Among them, substituted or unsubstituted alkyl and aralkyl groups containing 1 to 20 carbon atoms are preferred.

The substituted or unsubstituted alkyl groups are not particularly restricted but include straight-chain and branched ones, such as methyl, ethyl, propyl, isopropyl, n-butyl, sec-butyl, tert-butyl, n-amyl, isoamyl, neoamyl, hexyl, heptyl, octyl, 2-ethylhexyl, etc. Among them, methyl, ethyl, propyl, isopropyl and n-butyl groups are preferred.

The substituted or unsubstituted cycloalkyl groups are not particularly restricted but include, among others, cyclopentyl and cyclohexyl. The aryl groups are not particularly restricted but include, among others, phenyl, tolyl, xylyl, etc.

The substituted or unsubstituted aralkyl groups are not particularly restricted but include, among others, benzyl, 2-chlorobenzyl, 3-chlorobenzyl, 4-chlorobenzyl, 2-bromobenzyl, 3-bromobenzyl, 4-bromobenzyl, 2-iodobenzyl, 3-iodobenzyl, 4-iodobenzyl, dichlorobenzyl and like halobenzyl groups; 2-methylbenzyl, 3-methylbenzyl, 4-methylbenzyl, dimethylbenzyl, 3,4,5-trimethylbenzyl, 4-ethylbenzyl, 4-isopropylbenzyl, 4-butylbenzyl, 4-tert-butylbenzyl and like alkyl-substituted benzyl groups; dimethoxybenzyl, 2-ethoxybenzyl, 3-ethoxybenzyl, 4-ethoxybenzyl, 4-butoxybenzyl, 2-methoxybenzyl, 3-methoxybenzyl, 4-methoxybenzyl and like alkoxy-substituted benzyl groups; phenethyl, benzoin group, phenylpropyl and like benzyl and like phehethyl groups. Among them, benzyl, chlorobenzyl, methylbenzyl, ethylbenzyl and methoxybenzyl are preferred.

The substituted or unsubstituted acyl groups are not particularly restricted but include, among others, acetyl, propionyl, butyryl, ethoxycarbonyl, propoxycarbonyl, etc.

From the sufficient coating film hydrophilicity manifestation viewpoint, the whole or part of the above substituted or unsubstituted organic group containing 1 to 20 carbon atoms preferably comprises methyl, ethyl and/or propyl. Among these, methyl is most preferred.

From the sufficient coating film hydrophilicity manifestation and sufficient storage stability viewpoint, it is preferred that the above organic group partly comprise methyl.

As specific examples of the silicate compound (A), there may be mentioned tetramethoxysilane, tetraethoxysilane, tetra-n-propoxysilane, tetraisopropoxysilane, tetra-n-butoxysilane, tetra-sec-butoxysilane, tetra-tert-butoxysilane, tetra-n-pentoxysilane, tetraisopentoxysilane, tetraneopentoxysilane and the like; and condensation products derived from one or two or more of them.

As the silicate compound (A), there may also be mentioned alcohol exchange products derived from methyl silicate and/or a condensate(s) thereof as represented by the general formula (3) given below or ethyl silicate and/or a condensate(s) thereof as represented by the general formula (4) given below as a reaction substrate.

In that case, the silicate compound (A) occurs as an alcohol-modified silicate compound resulting from partial conversion of the methyl or ethyl groups of methyl silicate and/or a condensate(s) thereof or ethyl silicate and/or a condensate(s) thereof by the alcohol exchange reaction.

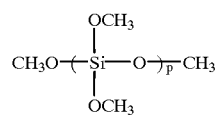

(3)

In the above formula, p has the same as m defined hereinabove.

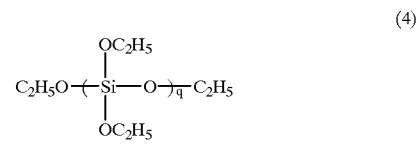

(4)

In the above formula, q has the same meaning as m defined hereinabove.

The above-mentioned methyl silicate and/or condensates are not particularly restricted but include commercial products such as "MS-51" and "MS-56" (both trademarks, products of Mitsubishi Chemical) and the like.

The above-mentioned ethyl silicate and/or condensates are not particularly restricted but include commercial products such as "Ethyl Silicate 40", "Ethyl Silicate 48" and "Ethyl Silicate 28" (all trademarks, products of Colcoat Co.) and the like.

The above alcohol exchange reaction is carried out by reacting the above methyl silicate and/or condensate(s) or ethyl silicate and/or condensate(s) as a reaction substrate with an alcohol compound as a reaction reagent.

The above alcohol compound includes substituted or unsubstituted alkyl alcohol compounds containing 2 to 20 carbon atoms and substituted or unsubstituted aralkyl alcohol compounds containing 7 to 20 carbon atoms. These may be used singly or two or more of them may be used in combination.

The substituted or unsubstituted alkyl alcohol compounds containing 2 to 20 carbon atoms are not particularly restricted but include, among others, alkyl alcohol compounds such as ethyl alcohol, propyl alcohol, isopropyl alcohol, n-butyl alcohol, sec-butyl alcohol, tert-butyl alcohol, n-amyl alcohol, isoamyl alcohol, hexyl alcohol, heptyl alcohol, octyl alcohol and 2-ethylhexyl alcohol; and ether alcohol compounds such as methylcellosolve, ethylcellosolve, butylcellosolve, hexylcellosolve and butyl diglycol. These may be used singly or two or more of them may be used in combination.

The substituted or unsubstituted aralkyl alcohol compounds containing 7 to 20 carbon atoms are not particularly restricted but include, among others, benzyl alcohol, 2-chlorobenzyl alcohol, 3-chlorobenzyl alcohol, 4-chlorobenzyl alcohol, 2-bromobenzyl alcohol, 3-bromobenzyl alcohol, 4-bromobenzyl alcohol, 2-iodobenzyl alcohol, 3-iodobenzyl alcohol, 4-iodobenzyl alcohol, dichlorobenzyl alcohol and like halobenzyl alcohols; 2-methylbenzyl alcohol, 3-methylbenzyl alcohol, 4-methylbenzyl alcohol, dimethylbenzyl alcohol, 3,4,5-trimethylbenzyl alcohol, 4-ethylbenzyl alcohol, 4-isopropylbenzyl alcohol, 4-butylbenzyl alcohol, 4-tert-butylbenzyl alcohol and like alkyl-substituted benzyl alcohols; dimethoxybenzyl alcohol, 2-ethoxybenzyl alcohol, 3-ethoxybenzyl alcohol, 4-ethoxybenzyl alcohol, 4-butoxybenzyl alcohol, 2-methoxybenzyl alcohol, 3-methoxybenzyl alcohol, 4-methoxybenzyl alcohol and like alkoxy-substituted benzyl alcohols; phenethyl alcohol, benzoin, phenylpropanol and like benzyl and like phenethyl alcohols. These may be used singly or two or more of them may be used in combination.

In effecting the above alcohol exchange reaction, an alcohol exchange catalyst may be used. The alcohol exchange catalyst is not particularly restricted but may be an acid or a base, for instance. The acid is not particularly restricted but includes, among others, Brønsted acids such as hydrochloric acid, sulfuric acid, phosphoric acid and sulfonic acids; and Lewis acids such as organotin compounds. The base is not particularly restricted but includes, among others, tertiary amines such as triethylamine, diisopropylethylamine, dimethylbenzylamine, diazabicyclo[2.2.2]octane and 1,8-diazabicyclo[5.4.0]undecene-7. These may be used singly or two or more of them may be used in combination.

It is not necessary to use a particular solvent in the above alcohol exchange reaction. For example, the alcohol compound, which is the reaction reagent, may be used as a solvent in excess relative to the reaction substrate.

The solvent is not particularly restricted but includes, among others, aromatic hydrocarbons such as toluene, benzene and xylene; halogenated hydrocarbons such as dichloroethane; ethers such as THF and dioxane; ketones such as methyl ethyl ketone and methyl isobutyl ketone; esters such as ethyl acetate and butyl acetate; dimethyl carbonate, acetonitrile and so on. These may be used singly or two or more of them may be used in combination.

The amount of the solvent is not particularly restricted but preferably is not more than 10 times, for instance, the total weight of the reaction substrate methyl silicate and/or condensate(s) thereof or ethyl silicate and/or condensate(s) thereof and the reaction reagent alcohol compound.

The ratio between the reaction substrate methyl silicate and/or condensate(s) thereof or ethyl silicate and/or condensate(s) thereof and the reaction reagent alcohol compound in the alcohol exchange reaction is not particularly restricted but may be, for example, such that the alcohol compound amounts to at least 1 mole percent relative to the reaction substrate and at least sufficient for the intended modification.

The above alcohol exchange reaction may be carried out while azeotropically distilling off the methanol formed upon modification.

The reaction temperature for the alcohol exchange reaction is not particularly restricted but generally is 0° C. to 200° C. The reaction time is not particularly restricted, either, but preferably not longer than 24 hours, for instance. The pressure during the reaction is not particularly restricted, either, but the reaction is generally carried out at ordinary pressure. The reaction may be carried out under reduced pressure so that the byproduct methanol can be distilled off.

The conversion rate in the alcohol exchange reaction can be checked by measuring the amount of the methanol formed, NMR spectrometry, or GC (gas chromatography), for instance. The product obtained in the above manner generally occurs as a colorless to light-yellow oily substance.

The silicate compound (A) can be obtained not only by the alcohol exchange reaction, as mentioned above, but also by another production method, for example by the method comprising copolymerizing a polymerizable polysiloxane compound or a silane compound having chain transfer capacity with a monofunctional monomer.

From the coating film hydrophilicity manifestation viewpoint, methyl silicate condensates are most preferred as the silicate compound (A).

The hydroxyl-containing acrylic resin obtained by grafting the silicate compound (A), the polyester resin obtained by grafting the silicate compound (A), the half-esterified acid group-containing acrylic copolymer (I) obtained by grafting the silicate compound (A), the epoxy-containing acrylic copolymer (II) obtained by grafting the silicate compound (A), the carboxyl-containing polyester resin (III) obtained by grafting the silicate compound (A) and all the silicate graft polymers (V) obtained by grafting the silicate compound (A) onto the hydroxyl-containing polymer (V-a) are obtained by grafting the silicate compound (A) onto the respective polymers mentioned above. The silicate compound (A) may comprise a single species or a combination of two or more species.

The method of effecting the grafting reaction is not particularly restricted but the reaction may be carried out without using any solvent or in an organic solvent.

The organic solvent is not particularly restricted but includes, among others, alcohols such as methanol, ethanol, propanol and butanol; ketones such as acetone and methyl ethyl ketone; and ethers such as tetrahydrofuran and dioxane. Those having a boiling point of not higher than 100° C. are preferred since they can be removed with ease by distillation or the like procedure.

Although the reaction temperature and time in the above grafting reaction may vary depending on the raw material species, the reaction is generally carried out preferably at room temperature to 150° C. within 24 hours. A reaction temperature lower than room temperature will not allow the silicate compound (A) to be grafted to a sufficient extent. A temperature above 150° C. or a longer time than 24 hours will allow molecules of the silicate compound (A) to condense with one another. The pressure in the grafting reaction is preferably within the range of $1 \times 10^{-3}$ to 7600 Torr.

The $R^1O$— group, in particular methoxy group, in the polymer obtained by grafting the silicate compound (A) tends to be converted to a hydroxyl group with the lapse of time and, therefore, the angle of contact of the coating film surface with water becomes decreased, namely the coating film is given hydrophilicity. Therefore, supposedly, it becomes possible for contaminants adhering to the coating film surface to be readily washed away and the coating film manifests high stain resistance. Further, the polymer obtained by grafting silicate compounds (A) has an adequate level of compatibility with the other resin constituents owing to the presence of methoxy and like groups and provides the surface of the coating films formed with satisfactory stain resistance.

Furthermore, unlike the low condensates of tetramethyl silicate and/or tetraethyl silicate, the polymer obtained by grafting the silicate compound (A) hardly undergoes condensation reactions or reactions with other resin constituents during storage of the coating since said polymer is formed by the reaction of the most reactive alkyl groups of the silicate compound (A) with the above hydroxyl groups of the hydroxyl-containing polymer and the most reactive portions of the silicate compound (A) are blocked. Thus, the coating containing the same is superior in storage stability and the coating films obtained therefrom show sufficient hydrophilicity and manifest high stain resistance of the coating film surface stably even after storage of the coating.

Further, unlike the tetramethyl silicate and/or low condensates thereof, the polymer obtained by grafting the silicate compound (A), which is formed by grafting the silicate compound (A) onto one of the resin constituents mentioned above, is excellent in compatibility with the other resin constituents in the coating and the hydrophilic groups after coating are prevented, to an appropriate extent, from localizing on the coating film surface layer. The water resistance is thus improved.

The alcohol-modified silicate compounds (IV) to be used in the practice of the invention is represented by the general formula (2):

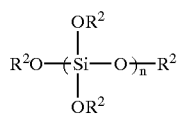

(2)

In the above general formula (2), n represents an integer of 1 to 50, one or some of the $R^2$ groups each represents a substituted or unsubstituted alkyl group containing 2 to 20 carbon atoms, preferably 3 to 15 carbon atoms and/or a substituted or unsubstituted aralkyl group containing 7 to 20 carbon atoms and the other $R^2$ group(s) each represents a methyl group.

When, in the above general formula (2), n exceeds 50, the viscosity of the resulting alcohol-modified silicate compound (IV) is increased, whereby the migration thereof to the coating film surface becomes difficult. It also becomes difficult for the alcohol-modified silicate compound (IV) obtained to evaporate from the coating film surface in the step of curing by heating. From the proper viscosity viewpoint, n is preferably 5 to 30, more preferably 7 to 20, still more preferably 10 to 15.

More preferred as the substituted or unsubstituted alkyl group containing 2 to 20 carbon atoms, preferably 3 to 15 carbon atoms and the substituted or unsubstituted aralkyl group containing 7 to 20 carbon atoms are those containing 3 to 10 carbon atoms and those containing 7 to 10 carbon atoms, respectively. When the number of carbon atoms is smaller than the above lower limit, the reactivity becomes excessively high and the storage stability becomes poor. When it exceeds the above upper limit, the hydrophilicity-providing function cannot be performed any longer.

The method of producing the alcohol-modified silicate compound (IV) is not particularly restricted but, for example, may comprise subjecting methyl silicate and/or its condensate(s) represented by the formula (3) as a reaction substrate to an alcohol exchange reaction. In this case, the above alcohol-modified silicate compound (IV) is obtained by partial modification of the methyl groups of methyl silicate and/or its condensate(s) by the alcohol exchange reaction.

The alcohol exchange reaction can be carried out by contacting the above methyl silicate and/or its condensate(s) as a reaction substrate with an alcohol compound as a reagent in the same manner as in the alcohol exchange reaction mentioned hereinbefore.

The alcohol compound includes substituted or unsubstituted alkyl alcohol compounds containing 2 to 20 carbon atoms, preferably 3 to 15 carbon atoms, and substituted or unsubstituted aralkyl alcohol compounds containing 7 to 20 carbon atoms. These may be used singly or two or more of them may be used in combination.

The substituted or unsubstituted alkyl alcohol compounds containing 2 to 20 carbon atoms, preferably 3 to 15 carbon atoms, are not particularly restricted but include, among others, the same alkyl alcohol compounds as mentioned hereinbefore. Among them, propyl alcohol, isopropyl alcohol, n-butyl alcohol, sec-butyl alcohol, butylcellosolve, methoxypropanol and ethoxypropanol are preferably used.

The substituted or unsubstituted aralkyl alcohol compounds containing 7 to 20 carbon atoms are not particularly restricted but include, among others, the same aralkyl alcohol compounds as mentioned hereinbefore. Among them, benzyl alcohol, chlorobenzyl alcohol, methylbenzyl alcohol, ethylbenzyl alcohol and methoxybenzyl alcohol are preferably used.

The methoxy groups of the above alcohol-modified silicate compound (IV) are readily converted to hydroxyl groups with the lapse of time and, therefore the angle of contact of the coating film surface with water decreases and the coating film surface is thus provided with hydrophilicity. Therefore, presumably, stains adhering to the coating film surface can be readily washed away and the coating film manifests high stain resistance.

Further, the presence of methoxy groups renders the alcohol-modified silicate compound (IV) compatible with the other resin constituents to an appropriate extent and, therefore, sufficient stain resistance is developed on the surface of the coating film formed.

Furthermore, in the alcohol-modified silicate compound (IV) obtained by the alcohol exchange reaction, when $R^2$ is a methyl group, for instance, the methyl groups have partly been substituted, in descending order of activity, by alkyl groups containing a larger number of carbon atoms or aralkyl groups and, in this way, highly active portions have been blocked. Thus, unlike simple tetramethyl silicate condensates, the compound (IV) hardly undergoes the condensation or reactions with the other resin constituents during storage of the coating, hence the coating shows good storage stability, and the coating films obtained from the coating after storage, too, show sufficient hydrophilicity and manifest high stain resistance on the surface thereof stably even after storage.

Further, the polymer obtained by grafting the silicate compound (A) is obtained by grafting the silicate compound (A) onto the hydroxyl-containing polymer, unlike tetramethyl silicate and/or condensates thereof, and therefore it is superior in compatibility with the other resin constituents in the coating. Therefore, the localization of hydrophilic groups to the coating film surface layer after application is suppressed and becomes moderate, hence the water resistance is improved.

When the clear coating for top coating to be used in the practice of the invention is the above-mentioned acid/epoxy-curable clear coating, the alcohol compound used as the reaction reagent in the production of the alcohol-modified silicate compound (V) by the alcohol exchange reaction mentioned above, or the alcohol compound used as the reagent in the production of the above silicate compound (A) by the alcohol exchange reaction mentioned above may be used as a solvent.

The addition amount of the above alcohol compound is preferably 10 to 200 parts by weight per 100 parts by weight of the above silicate compound (A). By adding the alcohol compound, the polymer obtained by grafting the silicate compound (A) can be stabilized during storage of the clear coating for top coating and, further, coating film abnormalities can be prevented in the step of curing by heating.

When the above-mentioned blocked polyisocyanate is used as the melamine type curing agent in the base coating to be used in the practice of the invention, a curing catalyst can be used. The curing catalyst is not particularly restricted but includes, among others, organotin compounds such as dibutyltin laurate, dibutyltin octoate and dibutyltin diacetate; metal chelate compounds such as aluminum tris (acetylacetonate), titanium tetrakis(acetylacetonate), titanium bis(acetylacetonate), titanium bis(butoxy)-bis (acetylacetonate), titanium bis(isopropoxy)-bis (acetylacetonate), zirconium bis(butoxy)-bis (acetylacetonate) and zirconium bis(isopropoxy)-bis (acetylacetonate). These may be used singly or two or more of them may be used in combination. Among them, organotin compounds are generally used.

When the above-mentioned amino resin is used as the above melamine type curing agent in the base coating to be used in the practice of the invention, a curing catalyst can be used, too.

The above curing catalyst is not particularly restricted but includes, among others, aromatic sulfonic acids such as dodecylbenzenesulfonic acid, dinonylnaphthalenesulfonic acid and p-toluenesulfonic acid; organic phosphonic acids such as aminotri(methylenephosphonic acid) and 1-hydroxyethylidene-1,1-diphosphonic acid; and amine salts of these. These may be used singly or two or more of them may be used in combination.

When the clear coating for top coating to be used in the practice of the invention is the acid/epoxy-curable clear coating, a curing catalyst is generally included therein. The curing catalyst is not particularly restricted but any of those generally used in the esterification reaction (reaction between acid and epoxy), preferably quaternary ammonium salts, among others. Specifically, there may be mentioned, in addition to the quaternary ammonium salts mentioned hereinbefore, benzyltriethylammonium chloride, benzyltriethylammonium bromide, tetrabutylammonium chloride, tetrabutylammonium bromide and the like. These may be used singly or two or more of them may be used in combination.

When the clear coating for top coating to be used in the practice of the invention is the melamine-curable clear coating, those curing catalysts mentioned above which can be used in the base coating usable in the practice of the invention can be used.

In the above base coating and the above clear coating for top coating, there may be incorporated melamine-formaldehyde resins for increasing the crosslink density and improving the water resistance, ultraviolet absorbers and/or light stabilizers for improving the weathering resistance of the coating films, microgels and/or surface modifiers for rheology controlling, diluents for viscosity adjustment, for instance, and so forth.

The ultraviolet absorber and light stabilizer are not particularly restricted but include, among others, Tinuvin 900 (product of Ciba-Geigy), Sanol LS-292 (product of Sankyo) and the like. The diluent is not particularly restricted but includes, among others, alcohol solvents such as methanol, ethanol, propanol and butanol; hydrocarbons, esters and like solvents. These may be used singly or two or more of them may be used in combination.

The curing catalyst is used preferably in an amount of 0.01 to 3.0% by weight relative to the total resin solids. The diluent is used preferably in an amount of at most 60% by weight, in particular 20 to 55% by weight, relative to the total weight of the coating diluted with the diluent.

Generally, the clear coating for top coating mentioned above does not contain any pigment. It may contain a color pigment, however, in an amount which will not impair the transparency of the coating films. The pigment is not particularly restricted but includes, among others, iron oxide, lead oxide, carbon black, coal dust, titanium dioxide, talc, barium sulfate, cadmium yellow, cadmium red, chrome yellow, metal pigments (e.g. aluminum flakes etc.), organic pigments (e.g. phthalocyanine blue, Cinquacia red, etc.), pearl mica and so on. These may be used singly or two or more of them may be used in combination.

The base coating mentioned above has a solids content of 15 to 60% by weight, preferably 20 to 55% by weight. The solids content in the step of application is 10 to 50% by weight, preferably 20 to 45% by weight.

The clear coating for top coating has a solids content of 25 to 70% by weight, preferably 35 to 65% by weight. The solids content on the occasion of application is 15 to 65% by weight, preferably 30 to 60% by weight.

The method of preparing the above base coating and the above clear coating for top coating is not particularly restricted but they can be prepared by mixing up the constituents mentioned above using an agitator or the like. When they contain such a pigment as mentioned above, the pigment can be incorporated by kneading using a kneader, roll or the like.

Further, the polymer obtained by grafting the silicate compound (A) and/or the alcohol-modified silicate compound (IV) may be added to and mixed with the coating prior to application or may be added to and mixed with the coating in advance in the step of producing the coating. In cases where it is added to and mixed with the coating, the resulting composition is preferably stored under such conditions that water will not enter it so that the hydrolysis and/or condensation reaction may not proceed.

In cases where, in the practice of the invention, the base coating film comprises a color pigment- and/or luster pigment-containing base coating film alone, the clear coating for top coating to be used in accordance with the invention is applied, by the wet-on-wet technique, onto the base coating film formed on the above coated automotive panel and then curing is effected by heating, whereby a two-coat one-bake (2C1B) multilayer coating film can be formed.

In cases where the base coating film is formed by a color base coating film and such a luster pigment-containing base coating film as mentioned above and when the color base coating film alone is cured by heating, the luster pigment-containing base coating is applied thereonto and the above-mentioned clear coating for top coating is applied further thereonto by the wet-on-wet technique, followed by curing by heating. In this way, a three-coat two-bake (3C2B) multilayer coating can be formed.

When the color base coating film is not cured singly by heating, the luster pigment-containing base coating is applied thereonto by the wet-on-wet technique and the clear coating for top coating is further applied thereonto by the wet-on-wet technique. Curing can then be effected by heating.

Thus, it is possible to form a three-coat one-bake (3C1B) composite coating film by forming a composite coating using the above color base coating film, luster pigment-containing base coating film and clear top coating film combinedly by the wet-on-wet technique and then curing the same by heating. In this way, a composite coating film showing more improved decorativeness can be formed.

The above base coating and the above clear coating for top coating can be applied by spray coating, brush coating, dip coating, electrostatic coating, roll coating, flow coating and other techniques. The base coating and the clear coating for top coating give cured coating films with a high degree of crosslinking when cured at a temperature of 100 to 180° C., preferably 120 to 160° C. Although the curing time depends on the curing temperature and other factors, a period of 10 to 30 minutes is appropriate at 120 to 160° C.

Generally, the dry film thickness formed by the above base coating is preferably about 8 to 40 $\mu$m, more preferably about 10 to 30 μm. When the dry film thickness is less than 8 μm, the substrate cannot be hidden and, when it exceeds 40 μm, troubles such as foaming and sagging may occur in the step of application.

The dry film thickness formed by the clear coating for top coating is preferably 10 to 80 μm, more preferably about 15 to 60 μm, although it varies according to the intended use. When the dry film thickness is less than 10 μm, the substrate cannot be hidden and, when it exceeds 60 μm, troubles such as foaming and sagging may occur in the step of application.

The base coating and the clear coating for top coating to be used in the practice of the invention are excellent in storage stability since the alcohol-modified silicate compound (IV) and the polymer obtained by grafting the silicate compound (A) hardly undergo the condensation or the reaction with other resin constituents during storage of the coating, as mentioned hereinbefore.

It is also presumable that the curing reaction of the base coating to be used in accordance with the invention includes not only the curing reaction between the hydroxyl-containing acrylic resin or polyester resin and the melamine type curing agent but also the hydrolysis/condensation of the $R^1O-$ groups in the polymer obtained by grafting the silicate compound (A) in the presence of a catalyst and the simultaneous reaction of said group with the hydroxyl-containing acrylic resin, polyester resin and/or melamine type curing agent to thereby allow the curing to proceed.

In cases where the clear coating for top coating is an acid/epoxy-curable clear coating, if a polymer containing simply acid anhydride groups is used, it will not be judicious to store it in the same system, since the reaction with an active hydrogen-containing compound(s) can proceed even at around ordinary temperature to cause gelation.

When the acid/epoxy-curable clear coating according to the invention is used, no further reaction occurs with an active hydrogen-containing compound(s) and it is possible to prepare one-component (one pack) formulations, since the acid anhydride groups have been modified (half-esterified).

Further, in the curing reaction with an active hydrogen-containing compound(s) in the step of coating film formation, it is possible to modify the rate of curing by selecting the modifying agent for acid anhydride group from among various species. Thus, it is possible to form coating films outstanding in appearance.

When the clear coating for top coating to be used according to the invention is an acid/epoxy-curable clear coating, the curing reaction supposedly proceeds as follows: First, the acid anhydride-derived half-esterified, open-ring modified groups in the half-esterified acid group-containing acrylic copolymer (I) undergo ring closure again at the curing temperature to once return to acid anhydride groups.

Then, the hydroxyl groups in the epoxy-containing acrylic copolymer (II) react therewith to form half-ester groups again. Then, the remaining carboxylic groups in the half-esterified acid group-containing acrylic copolymer (I) react with the epoxy groups in the epoxy-containing acrylic copolymer (II) to form diester moieties.

Further, the $R^2O-$ groups and/or $R^1O-$ groups in the polymer obtained by grafting the alcohol-modified silicate compound (IV) and/or silicate compound (A) undergo hydrolysis/condensation under the action of the acid catalyst activity of the half-esterified acid group-containing acrylic copolymer (I) and at the same time react with the hydroxyl groups in the epoxy-containing acrylic copolymer (II).

Thus, the above curing reaction is considered to proceed as a result of such mutual reactions of two or three constituents as the binding of the two group species, namely the epoxy and hydroxyl groups, in the epoxy-containing acrylic copolymer (II) to the acid anhydride modification groups, namely the carboxyl and ester groups, in the half-esterified acid group-containing acrylic copolymer (I), and the binding of the hydroxyl groups in the epoxy-containing acrylic copolymer (II) to the alcohol-modified silicate compound (IV) and/or the polymer obtained by grafting the silicate compound (A) and/or hydrolyzate/condensates thereof.

When the above acid/epoxy-curable clear coating further comprises the carboxyl-containing polyester resin (III) as a resin constituent, it is also presumable that the resin constituents react also with the carboxyl-containing polyester resin (III) mutually to allow the curing to proceed.

In cases where the clear coating for top coating to be used in the practice of the invention is a melamine-curable clear coating, too, the curing presumably proceeds in the same manner as the above-mentioned curing reactions of the base coating.

Therefore, the cured coating films formed by the process for forming a multilayer coating film on automotive bodies in accordance with the present invention become firm in structure and thus excellent in weathering resistance, chemical resistance, scratch resistance, etc. Further, when a multilayer coating film is formed on the above-mentioned coated automotive panel provided with the above base coating and the above clear coating for top coating by the two-coat one-bake (2C1B) technique, the alcohol-modified silicate compound (IV) and/or the polymer obtained by grafting the silicate compound (A) develops onto the surface of the coating films, since the above clear coating for top coating contains the alcohol-modified silicate compound (IV) and/or the polymer obtained by grafting the silicate compound (A) and the above base coating, too, contains the polymer obtained by grafting the silicate compound (A). As a result, a wet coating film is formed in which the alcohol-modified silicate compound (IV) and/or the polymer obtained by grafting the silicate compound (A) occurs abundantly in the vicinity of the coating film surface and, when this film is then cured by heating, a cured coating film is formed on the surface of which the methoxy and like groups derived from the alcohol-modified silicate compound (IV) and/or the polymer obtained by grafting the silicate compound (A) occur abundantly and which can thus manifest stain resistance, as mentioned hereinbefore.

The cured coating films formed by the process for forming a multilayer coating film on automotive bodies in accordance with the invention are provided with hydrophilicity by reacting with an acid. The coating films may be provided with stain resistance either gradually with the lapse of time or by treatment with an acid beforehand from the early stage.

When a multilayer coating film is formed on the above coated automotive panel by applying the above base coating and the above clear coating for top coating by the two-coat one-bake (2C1B) technique according to the process of the invention for forming a multilayer coating film on automotive bodies, coating films excellent in NSR capacity and water resistance can be formed without giving the possibility of water entering into the interlayer space between the first coat clear coating film and the second coat base coating film with the lapse of time, since the above base coating contains the polymer obtained by grafting the silicate compound (A) as a constituent capable of manifesting stain resistance and, therefore, is superior in NSR capacity with respect to the coated automotive panel to the case of a relatively low molecular silicate compound being contained.

The automotive body on which a multilayer coating film has been formed using the process of the present invention for forming a multilayer coating film on automotive bodies has such basic performance characteristics such as weathering resistance, in particular excellent acid resistance, and further has high hydrophilicity and therefore can maintain the same effect as that of maintenance-free car wash, and the coating can stably exhibit performance characteristics even with the coating after storage and is excellent further in NSR capacity and water resistance, since the multilayer coating film is formed by the process of the invention for forming a multilayer coating film on automotive bodies. Such automotive body, too, falls within the scope of one aspect of the present invention.

The process for forming a multilayer coating film on automotive bodies, which is constituted as mentioned above, provide cured coating films having a high density of crosslinks. Therefore, the cured coating films have basic performance characteristics such as weathering resistance and acid resistance. They have high hydrophilicity and therefore maintain their decorativeness without car wash. No storage stability problem is produced. In addition, the coating films are excellent in NSR capacity and water resistance, so that the appearance of the coating films will not be impaired. The automotive body of the invention shows good appearance and coating film performance characteristics and is maintenance-free, needing no car wash.

EXAMPLES

The following examples illustrate the invention in further detail. They are, however, by no means limitative of the scope of the invention.

Synthesis Example 1

Hydroxyl-containing Acrylic Resin (a)-1

A reaction vessel equipped with a thermometer, stirrer, condenser, nitrogen inlet tube and dropping funnel was charged with 400 weight parts of toluene and 100 weight parts of n-butanol and the temperature was raised to 105° C. To this reaction vessel was added dropwise, using the dropping funnel, over 3 hours a solution composed of 100 weight parts of styrene, 300 weight parts of methyl methacrylate, 440 weight parts of ethyl acrylate, 140 weight parts of 2-hydroxyethyl methacrylate, 20 weight parts of methacrylic acid, 20 weight parts of t-butyl peroxy-2-ethylhexanoate and 300 weight parts of toluene. Thereafter, the temperature was maintained at 105° C. for 30 minutes and, then, 3 weight parts of t-butyl peroxy-2-ethylhexanoate and 200 weight parts of toluene were added. After this addition, the reaction was further allowed to proceed at 105° C. for 2 hours. A varnish with a nonvolatile matter content of 50% was obtained which contained a hydroxyl-containing acrylic resin (a)-1 having a number average molecular weight (Mn) of 18,000, an acid value (on solids basis) of 13 mg KOH/g and a hydroxyl value (on solids basis) of 60 mg KOH/g.

Synthesis Example 2

Hydroxyl-containing Acrylic Resin (a)-2

A reaction vessel equipped with a thermometer, stirrer, condenser, nitrogen inlet tube and dropping funnel was charged with 670 weight parts of Solvesso 100 (trademark, aromatic solvent, product of Esso) and 100 weight parts of n-butanol and the temperature was raised to 125° C. To this reaction vessel was added dropwise, using the dropping funnel, over 3 hours a solution composed of 300 weight parts of styrene, 350 weight parts of 2-ethylhexyl methacrylate, 100 weight parts of 2-ethylhexyl acrylate, 220 weight parts of 2-hydroxyethyl methacrylate, 30 weight parts of methacrylic acid, 40 weight parts of t-butyl peroxy-2-ethylhexanoate and 50 weight parts of Solvesso 100. Thereafter, the temperature was maintained at 125° C. for 30 minutes and, then, 5 weight parts of t-butyl peroxy-2-ethylhexanoate and 20 weight parts of Solvesso 100 were added. After this addition, the reaction was further allowed to proceed at 125° C. for 2 hours. A varnish with a nonvolatile matter content of 55% was obtained which contained a hydroxyl-containing acrylic resin (a)-2 having a number average molecular weight (Mn) of 8,000, an acid value (on solids basis) of 20 mg KOH/g and a hydroxyl value (on solids basis) of 95 mg KOH/g.

Synthesis Example 3

Polyester Resin (b)

A reaction vessel equipped with a thermometer, stirrer, condenser, nitrogen inlet tube, water trap and rectifying column was charged with 415 weight parts of isophthalic acid, 90 weight parts of adipic acid, 100 weight parts of trimethylolpropane, 200 weight parts of neopentyl glycol, 195 weight parts of 2,2-dimethyl-3-hydroxypropyl 2,2-dimethyl-3-hydroxypropionate and 2 weight parts of dibutyltin oxide, and the mixture was heated and the temperature was raised to 210° C. From 160° C. to 210° C., the temperature was raised at a constant rate over 3 hours. The condensation water was distilled off out of the system. After arriving at 210° C., the temperature was maintained at that level and, after 1 hour of temperature maintenance, 30 weight parts of xylene was slowly added to the reaction vessel as a refluxing solvent, and the reaction was further allowed to proceed now in the manner of condensation in the presence of the solvent. Thereafter, after the acid value arriving at 8.5 mg KOH/g (on solids basis), the mixture was cooled to 150° C., 200 weight parts of ε-caprolactone was added, and the mixture was maintained at 150° C. for 2 hours and then cooled to 100° C. Xylene (430 weight parts) was further added. Thus was obtained a varnish with a nonvolatile matter content of 70% was obtained which contained a polyester resin (b) having a number average molecular weight (Mn) of 3,000, an acid value (on solids basis) of 7 mg KOH/g and a hydroxyl value (on solids basis) of 93 mg KOH/g.

Synthesis Example 4

Half-esterified Acid Group-containing Acrylic Copolymer (c)

A 3-liter reaction vessel equipped with a thermometer, stirrer, condenser, nitrogen inlet tube and dropping funnel was charged with 330 weight parts of xylene and 110 weight parts of propylene glycol monomethyl ether acetate, and the temperature was raised to 127° C. To this reaction vessel was added dropwise, using the dropping funnel, over 3 hours a solution composed of 300 weight parts of styrene, 360 weight parts of 2-ethylhexyl methacrylate, 112 weight parts of isobutyl acrylate, 26 weight parts of acrylic acid, 202 weight parts of maleic anhydride, 300 weight parts of propylene glycol monomethyl ether acetate, 90 weight parts of t-butyl peroxy-2-ethylhexanoate and 100 weight parts of xylene. Thereafter, the temperature was maintained at 127° C. for 30 minutes and, then, a solution composed of 10 weight parts of t-butyl peroxy-2-ethylhexanoate and 50 weight parts of xylene was added dropwise over 30 minutes. After this dripping, the reaction was further allowed to proceed at 127° C. for 1 hour. A varnish with a nonvolatile matter content of 53% was obtained which contained an acrylic poly acid anhydride (c)-1 having a number average molecular weight (Mn) of 3,000. To 1,990 weight parts of the varnish obtained was added 100 weight parts of methanol, and the reaction was allowed to proceed at 70° C. for 23 hours. A varnish with a nonvolatile matter content of 55% was obtained which contained a half-esterified acid group-containing acrylic copolymer (c) having an acid value (on solids basis) of 127 mg KOH/g. This half-esterified acid group-containing acrylic copolymer (c) was subjected to infrared spectrometry and the disappearance of the acid anhydride group-due absorption (1785 cm$^{-1}$) was confirmed.

Synthesis Example 5

Carboxyl-containing Polyester Resin (d)

A reaction vessel equipped with a thermometer, stirrer, condenser, nitrogen inlet tube, water trap and rectifying column was charged with 136 weight parts of pentol, 456 weight parts of ε-caprolactone and 0.1 weight part of dibutyltin oxide, and the temperature was raised to 170° C. and the temperature was maintained at 170° C. for 3 hours. Thereafter, 539 weight parts of hexahydrophthalic anhydride melted by warming was added, and the mixture was maintained at 150° C. for 1 hour and then 464 weight parts of ethyl 3-ethoxypropionate was added. Thus was obtained a varnish with a nonvolatile matter content of 71% was obtained which contained a carboxyl-containing polyester resin (d) having a number average molecular weight (Mn) of 1,700, a weight average molecular weight (Mw)/number average molecular weight (Mn) ratio of 1.28, an acid value (on solids basis) of 174 mg KOH/g and a hydroxyl value (on solids basis) of 25 mg KOH/g.

Synthesis Example 6

Epoxy-containing Acrylic Copolymer (e)

A 2-liter reaction vessel equipped with a thermometer, stirrer, condenser, nitrogen inlet tube and dropping funnel was charged with 500 weight parts of xylene, and the temperature was raised to 125° C. To this reaction vessel was added dropwise, using the dropping funnel, over 3 hours a solution composed of 380 weight parts of glycidyl methacrylate, 200 weight parts of styrene, 292 weight parts of 2-ethylhexyl methacrylate, 128 weight parts of 4-hydroxybutyl acrylate, 100 weight parts of t-butyl peroxy-2-ethylhexanoate and 100 weight parts of xylene. Thereafter, the temperature was maintained at 125° C. for 30 minutes and, then, a solution composed of 10 weight parts of t-butyl peroxy-2-ethylhexanoate and 10 weight parts of xylene was added dropwise over 30 minutes. After this dripping, the reaction was further allowed to proceed at 125° C. for 1 hour. A varnish with a nonvolatile matter content of 62% was obtained which contained an epoxy-containing acrylic resin (e) having a number average molecular weight (Mn) of 3,700, an epoxy equivalent (on solids basis) of 400 and a hydroxyl value (on solids basis) of 47 mg KOH/g.

Synthesis Example 7

Alcohol-modified Silicate Compound (f)

MS-56 (trademark, product of Mitsubishi Chemical) was used as methyl silicate and subjected to alcohol exchange reaction with isopropyl alcohol to give a composition with a nonvolatile matter content of 100% which contained an alcohol-modified silicate compound (f). The alcohol exchange reaction conditions were as follows: 74 g of MS-56 was mixed with 21 g of isopropyl alcohol and 0.2 g of triethylamine, and the reaction was allowed to proceed at a temperature of 80° C. for 12 hours and then the methanol formed was distilled off under reduced pressure.

Synthesis Example 8

Silicate Graft Polymer (g)-1

A one-liter reaction vessel equipped with a thermometer, stirrer, condenser and nitrogen inlet tube was purged with nitrogen gas and then charged with 100 weight parts of the alcohol-modified silicate compound (f) obtained in Synthesis Example 7, 300 weight parts of the hydroxyl-containing acrylic resin (a)-1 obtained in Synthesis Example 1 and 3 weight parts of trimethyl orthoacetate, and the grafting reaction was allowed to proceed at 90° C. for 12 hours. A varnish with a nonvolatile matter content of 63% was obtained which contained a silicate graft polymer (g)-1, namely the acrylic resin with the silicate compound grafted thereon.

Synthesis Example 9

Silicate Graft Polymer (g)-2

A one-liter reaction vessel equipped with a thermometer, stirrer, condenser and nitrogen inlet tube was purged with nitrogen gas and then charged with 100 weight parts of the alcohol-modified silicate compound (f) obtained in Synthesis Example 7, 150 weight parts of the polyester resin (b) obtained in Synthesis Example 3 and 2 weight parts of trimethyl orthoacetate, and the grafting reaction was allowed to proceed at 90° C. for 12 hours. A varnish with a nonvolatile matter content of 82% was obtained which contained a silicate graft polymer (g)-2, namely the polyester resin with the silicate compound grafted thereon.

Synthesis Example 10

Silicate Graft Polymer (g)-3

A one-liter reaction vessel equipped with a thermometer, stirrer, condenser and nitrogen inlet tube was purged with nitrogen gas and then charged with 100 weight parts of MS-56 (trademark, product of Mitsubishi Chemical) as methyl silicate and 270 weight parts of the epoxy-containing acrylic copolymer (e) obtained in Synthesis Example 6, and the grafting reaction was allowed to proceed at 90° C. for 12 hours. A varnish with a nonvolatile matter content of 72% was obtained which contained a silicate graft polymer (g)-3, namely the epoxy-containing acrylic copolymer with the silicate compound grafted thereon.

Synthesis Example 11

Silicate Graft Polymer (g)-4

A one-liter reaction vessel equipped with a thermometer, stirrer, condenser and nitrogen inlet tube was purged with nitrogen gas and then charged with 100 weight parts of the alcohol-modified silicate compound (f) obtained in Synthesis Example 7, 280 weight parts of the hydroxyl-containing acrylic resin (a)-2 obtained in Synthesis Example 2 and 3 weight parts of trimethyl orthoacetate, and the grafting reaction was allowed to proceed at 90° C. for 12 hours. A varnish with a nonvolatile matter content of 67% was obtained which contained a silicate graft polymer (g)-4, namely the acrylic resin with the silicate compound grafted thereon.

Examples 1 to 3

A vessel was charged with the respective constituents specified in Table 1 or 2 according to each formulation specified therein and the resulting mixture was agitated with a Disper apparatus. In this manner, base coatings (1) and (2) and clear coatings for top coating (1) to (3) to be used according to the invention were obtained.

Then, the base coatings (1) and (2) and clear coatings for top coating (1) to (3) were respectively adjusted to a coating viscosity of 20 seconds (Ford cup No. 4) with a thinner composed of butyl acetate and xylene in a ratio of 1/1.

Test panels prepared by coating phosphate-treated steel sheets with Nippon Paint's Powertop U-30 (cationic electrodeposition coating) and Orga P-2 (polyester/melamine type gray intermediate coating) (both trademarks) to dry film thicknesses of 25 μm and 40 μm, respectively, followed by heat curing were coated with Nippon Paint's Superlac M-170 (trademark), a silver metallic base coating, at an atomizing pressure of 5 kg/cm² using an electrostatic coater (Auto REA, trademark, product of Landsberg Gema) and, after about 7 minutes of setting, one of the clear coatings for top coating (1) to (3) as adjusted to the coating viscosity, as shown in Table 3, was applied thereonto by spraying in the wet-on-wet manner and, after about 7 minutes of setting, the coatings were dried and baked at 140° C. for 30 minutes. Thus were prepared coated test panels after the first coat performed by the two-coat one-bake (2C1B) coating technique and they were allowed to stand in a desiccator for 30 minutes. The base coating and clear coating were applied so that the cured coatings might have dry film thicknesses of 15 μm and 40 μm, respectively.

Then, the base coating (1) or (2) adjusted to the coating viscosity was applied by spraying to the respective coated test panels obtained by the first coat and one of the clear coatings for top coating (1) to (3) as adjusted to the coating viscosity, as shown in Table 3, was applied thereonto by spraying in the wet-on-wet manner and, after about 7 minutes of setting, the coatings were dried and baked at 140° C. for 30 minutes to give coated test panels after the second coat performed by the two-coat one-bake (2C1B) coating technique. The base coating and clear coating were applied so that the cured coating films might have dry film thicknesses of 15 μm and 40 μm, respectively. The multilayer coating film obtained were evaluated by the evaluation methods described below. The results obtained are given in Table 3.

Evaluation Methods (1) NSR Capacity (1-a) Initial Recoat Adhesiveness

The cutting-edge of a cutter (NT cutter (trademark) type S, type A or an equivalent) was maintained at an angle of about 30 degrees relative to the face of each initial cured coating film obtained and checkers (each square 2 mm×2 mm) reaching the substrate were marked, and an adhesive tape (Nichiban's Cellotape) was uniformly laid thereon under finger pressure without causing any air bubble to remain. Immediately thereafter, one end of the adhesive tape was held and abruptly pulled to thereby peel off the adhesive tape from the test panel perpendicularly to the coating film surface. The initial recoat adhesiveness was evaluated by determining the ratio [number of squares not peeled off]/[number of squares peeled off] by visual inspection.

(1-b) Recoat Adhesiveness after Warm Water Resistance Test

Each cured coating obtained was immersed in warm water at 40° C. for 10 days and then evaluated for recoat adhesiveness after warm water resistance test in the same manner as for initial recoat adhesiveness.

(1-c) Warm Water Resistance Test

Each cured coating film obtained was immersed in warm water at 40° C. for 10 days and the surface of the coating was evaluated by the eye according to the following criteria:

◯: No change is observed;

Δ: Slight bulging (blistering) is observable;

×: Distinct bulging (blistering) is observable.

(2) Stain Resistance Test by Outdoor Exposure

The outdoor exposure test prescribed in JIS K 5400 9.9 was carried out and, after the lapse of 1 month or 6 months, the angle of contact with water and the difference in lightness (ΔL) from the initial coating were measured.

(3) Acid Resistance Test

The cured coating films obtained were each contacted with 0.2 ml of 0.1 N aqueous $H_2SO_4$ at 80° C. for 30 minutes and the surface thereof was evaluated by the eye according to the following criteria:

o: No change is observed;

Δ: Slight trace is observable;

×: Distinct trace is observable.

Comparative Examples 1 to 3

Test panels coated by the two-coat one-bake (2C1B) technique were prepared in the same manner as in the above examples except that the clear coating for top coating (1) or (2) specified in Table 2, the base coating (3) or (4) specified in Table 1 and the clear coating for top coating (1) or (2) specified in Table 2 were used as the first coat clear coating for top coating, second coat base coating and second coat clear coating for top coating, respectively, used in the examples, as indicated in Table 3. Those panels were evaluated for performance characteristics of the multilayer coating film in the same manner as in the examples. The results are shown in Table 3.

TABLE 1

| | Volatile matter content | Base coating | | | |
|---|---|---|---|---|---|
| | (%) | (1) | (2) | (3) | (4) |
| Formulation (weight parts) | | | | | |
| Alpaste 7130N (trademark, product of Toyo Aluminum) | 64 | 7.9 | 7.9 | 7.9 | 7.9 |
| Hydroxyl-containing acrylic resin (a)-1 | 50 | 40.5 | 30.0 | 54.0 | 54.0 |
| Polyester resin (b) | 70 | — | 10.4 | — | — |
| Cymel 254 (trademark, product of Mitsui Cytec) | 80 | 22.5 | 22.5 | 22.5 | 22.5 |
| Silicate graft polymer (g)-1 | 63 | 17.8 | — | — | — |
| Silicate graft polymer (g)-2 | 82 | — | 11.3 | — | — |
| MS-58 (trademark, product of Mitsubishi Chemical) | — | — | — | — | 4.5 |

TABLE 1-continued

| | Volatile matter content (%) | Base coating (1) | (2) | (3) | (4) |
|---|---|---|---|---|---|
| Tinuvin 900 (trademark, product of Ciba Specialty Chemicals) | — | 0.5 | 0.5 | 0.5 | 0.5 |
| Sanol LS-770 (trademark, product of Sankyo) | — | 0.1 | 0.1 | 0.1 | 0.1 |
| Crosslinked resin particles | — | 5.0 | 5.0 | 5.0 | 6.0 |
| Surface modifier | — | 0.1 | 0.1 | 0.1 | 0.1 |
| n-Butanol | — | 3.0 | 3.0 | 3.0 | 3.0 |
| Solvesso 100 | — | 15.0 | 15.0 | 15.0 | 15.0 |

In Table 1, Alpaste 7130N (trademark, product of Toyo Aluminum) is an aluminum paste with an aluminum flake content of 64% by weight, Cymel 254 (trademark, product of Mitsui Cytec) is a melamine resin with a nonvolatile matter content of 80%, MS-56 (trademark, product of Mitsubishi Chemical) is methyl silicate, Tinuvin 900 (trademark, product of Ciba Specialty Chemicals) is an ultraviolet absorber, Sanol LS-770 (trademark, product of Sankyo) is a light stabilizer, the crosslinked resin particles are a structural viscosity providing agent occurring as a dispersion in xylene with a particle size of 90 nm and a nonvolatile matter content of 30% (product of Nippon Paint) and the surface modifier is Modaflow (trademark, product of Monsanto).

TABLE 2

| | Volatile matter content (%) | Clear coating (1) | (2) | (3) |
|---|---|---|---|---|
| Formulation (weight parts) | | | | |
| Hydroxyl-containing acrylic resin (a)-2 | 55 | 31.2 | — | — |
| Half-esterified acid group-containing acrylic copolymer (c) | 55 | — | 56.0 | 56.0 |
| Carboxyl-containing polyester resin (d) | 71 | — | 28.0 | 28.0 |
| Epoxy-containing acrylic copolymer (e) | 62 | — | 82.0 | 55.0 |
| U-Van 20N-60 (trademark, product of Mitsui Chemical) | 60 | 25.3 | — | — |
| Silicate graft polymer (g)-4 | 67 | 14.4 | — | — |
| Alcohol-modified silicate compound (f) | 100 | — | 10.0 | — |
| Silicate graft polymer (g)-3 | 72 | — | — | 37.0 |
| Terabutylammonium bromide | — | — | 0.1 | 0.1 |
| Tinuvin 900 (trademark, product of Ciba Specialty Chemicals) | — | 0.4 | 1.0 | 1.0 |
| Sanol LS-440 (trademark, product of Sankyo) | — | 0.2 | 0.5 | 0.5 |
| Crosslinked resin particles | — | 1.0 | 3.0 | 3.0 |
| Surface modifier | — | 0.1 | 0.1 | 0.1 |
| n-Butanol | — | 3.0 | 3.0 | 3.0 |
| Solvesso 100 | — | 6.0 | 5.0 | 5.0 |

In Table 2, U-Van 20N-60 (trademark, product of Mitsui Chemical) is a melamine resin with a nonvolatile matter content of 60% and Sanol LS-440 (trademark, product of Sankyo) is a light stabilizer.

TABLE 3

| | | Example 1 | 2 | 3 | 4 | Compar. Ex. 1 | 2 | 3 |
|---|---|---|---|---|---|---|---|---|
| First coat clear coating | Clear coating (1) | ○ | — | — | — | ○ | — | — |
| | Clear coating (2) | — | ○ | ○ | — | — | ○ | ○ |
| | Clear coating (3) | — | — | — | ○ | — | — | — |
| Second coating base coating | Base coating (1) | ○ | ○ | — | ○ | — | — | — |
| | Base coating (2) | — | — | ○ | — | — | — | — |
| | Base coating (3) | — | — | — | — | ○ | ○ | — |
| | Base coating (4) | — | — | — | — | — | — | ○ |
| Second coating clear coating | Clear coating (1) | ○ | — | — | — | ○ | — | — |
| | Clear coating (2) | — | ○ | ○ | — | — | ○ | ○ |
| | Clear coating (3) | — | — | — | ○ | — | — | — |
| NSR capacity | Initial recoat adhesion | 100/100 | 100/100 | 100/100 | 100/100 | 100/100 | 100/100 | 100/100 |
| | Recoat adhesion after warm water resistance test | 100/100 | 100/100 | 100/100 | 100/100 | 0/100 | 0/100 | 0/100 |
| | Warm water resistance test | ○ | ○ | ○ | ○ | × | × | × |
| Outdoor exposure stain resistance test | Angle of contact with water after 1 month (°) | 30 | 29 | 28 | 28 | | | |
| | ΔE after 1 month | 0 | 0.1 | 0 | 0 | | | |
| | Angle of contact with water after 6 months (°) | 24 | 25 | 24 | 22 | | | |
| | ΔE after 6 months | 0.1 | 0 | −0.1 | 0 | | | |
| Acid resistance test | | ○ | ○ | ○ | ○ | | | |

In Table 2, the outdoor exposure stain resistance test and acid resistance test were not conducted in Comparative Examples 1 to 3 since the NSR capacity was poor therein.

As is evident from Table 3, The multilayer coating film formed in the Examples showed good acid resistance and, in addition, after 1 month of exposure and after 6 months of exposure, showed low angles of contact with water, sufficient coating film surface hydrophilicity, good stain resistance and, furthermore, they were excellent in the initial recoat adhesion, the recoat adhesion after warm water resistance test and water resistance. Thus, the first coat clear coating films and second coat base coating films showed good NSR capacity, hence the appearance of the coating films was not impaired at all.

On the other hand, the multilayer coating film formed in the Comparative Examples were poor in recoat adhesion and warm water resistance after warm water resistance test, hence were poor in NSR capacity and the appearance of the coatings was impaired.

What is claimed is:

1. A process for forming a multilayer coating film on automotive bodies which comprises applying a clear coating for top coating, by the wet-on-wet technique, onto a base coating containing a color pigment and/or a luster pigment as applied to a coated automotive panel and then heating the coat layers for curing, said base coating comprising, as resin constituents, a product obtained by grafting a silicate compound (A) onto a hydroxyl-containing acrylic resin or polyester resin and an amino and/or blocked polyisocyanate curing agent, the amount of said silicate compound (A) grafted being 0.1 to 50% by weight (on solids basis) relative to the total amount of said resin constituents, said clear coating for top coating being an acid/epoxy-curable or amino and/or blocked polyisocyanate-curable clear coating, said clear coating for top coating containing or being free of an alcohol-modified silicate compound (IV) or a silicate graft polymer (V), at least one of the resin constituents in said acid/epoxy-curable clear coating and said amino and/or blocked polyisocyanate-curable clear coating being obtained by grafting said silicate compound (A) when said clear coating for top coating contains neither said alcohol-modified silicate compound (IV) nor said silicate graft polymer (V), said silicate graft polymer (V) being obtained by grafting said silicate compound (A) onto a hydroxyl-containing polymer (V-a), the amount of said alcohol-modified silicate compound (IV) and/or the amount of said silicate compound (A) grafted being 0.1 to 30% by weight (on solids basis) relative to the total amount of said resin constituents, said silicate compound (A) being represented by the general formula (1):

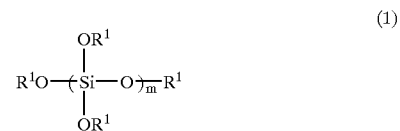

wherein m represents an integer of 1 to 50 and the $R^1$'s may be different and each represents a substituted or unsubstituted organic group containing 1 to 20 carbon atoms, and said alcohol-modified silicate compound (IV) being represented by the general formula (2):

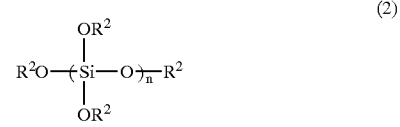

wherein n represents an integer of 1 to 50 and one or some of the $R^2$'s each represents a substituted or unsubstituted alkyl group containing 2 to 20 carbon atoms or a substituted or unsubstituted aralkyl group containing 7 to 20 carbon atoms and the remaining $R^2$'s respectively represent a methyl group.

2. The process for forming a multilayer coating film on automotive bodies according to claim 1, wherein said acid/epoxy-curable clear coating comprises, as resin constituents, a half-esterified acid group-containing acrylic copolymer (I) and an epoxy-containing acrylic copolymer (II), said half-esterified acid group-containing acrylic copolymer (I) is obtained by preparing a copolymer from an acid anhydride group-containing, radical-polymerizable monomer (I-a) and another radical-polymerizable monomer (I-b) and then half-esterifying said acid anhydride group with an alcohol compound having a molecular weight of 200 or less, and said epoxy-containing acrylic copolymer (II) is obtained by copolymerizing 30 to 70 parts by weight of an epoxy-containing, radical-polymerizable monomer (II-a), 10 to 50 parts by weight of a hydroxyl-containing, radical-polymerizable monomer (II-b) and 20 to 60 parts by weight of another radical-polymerizable monomer (II-c)

and has a number average molecular weight (Mn) of 1,000 to 8,000, an epoxy equivalent of 100 to 800 (on solids basis) and a hydroxyl value of 5 to 200 mg KOH/g (on solids basis).

3. The process for forming a multilayer coating film on automotive bodies according to claim 2, wherein the acid/epoxy-curable clear coating comprises a carboxyl-containing polyester resin (III) as a resin constituent, said carboxyl-containing polyester resin (III) is obtained by half-esterifying, with an acid anhydride group-containing compound, a polyester polyol obtained by allowing a lactone compound to add to a polyhydric alcohol compound having a molecular weight of 400 or less to thereby effect a chain extension reaction.

4. The process for forming a multiplayer coating film on automotive bodies according to claim 1, wherein the amino and/or blocked polyisocyanate-curable clear coating comprises, as resin constituents, 30 to 85% by weight of a hydroxyl-containing acrylic resin and 15 to 70% by weight of an amino and/or blocked polyisocanate curing agent, and said hydroxyl-containing acrylic resin has a number average molecular weight (Mn) of 800 to 8,000 and a hydroxyl value of 30 to 200 mg KOH/g (on solids basis).

* * * * *

UNITED STATES PATENT AND TRADEMARK OFFICE
CERTIFICATE OF CORRECTION

PATENT NO. : 6,472,020 B1
DATED : October 29, 2002
INVENTOR(S) : Yoshioka, Manabu and Toui, Teruzo It is certified that error appears in the above-identified patent and that said Letters Patent is hereby corrected as shown below:

Column 35,
Line 45, should read -- curable or amino resin and/or blocked polyisocyanate --
Line 51, should read -- curable clear coating and said amino resin and/or blocked --

Column 37,
Line 3, should read -- wherein the amino resin and/or blocked polyisocyanate-curable --
Line 6, should read -- and 15 to 70% by weight of an amino resin and/or blocked --

Signed and Sealed this

Eighteenth Day of March, 2003

JAMES E. ROGAN
*Director of the United States Patent and Trademark Office*